United States Patent
Okumura

(10) Patent No.: US 9,509,912 B2
(45) Date of Patent: Nov. 29, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Tetsuichirou Okumura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 14/159,706

(22) Filed: Jan. 21, 2014

(65) Prior Publication Data

US 2014/0211029 A1     Jul. 31, 2014

(30) Foreign Application Priority Data

Jan. 30, 2013    (JP) ................................ 2013-015283

(51) Int. Cl.
| | |
|---|---|
| G02B 27/64 | (2006.01) |
| G02B 15/14 | (2006.01) |
| H04N 5/232 | (2006.01) |
| G02B 15/22 | (2006.01) |
| G02B 15/173 | (2006.01) |

(52) U.S. Cl.
CPC .......... H04N 5/23287 (2013.01); G02B 15/14 (2013.01); G02B 15/173 (2013.01); G02B 15/22 (2013.01); G02B 27/646 (2013.01)

(58) Field of Classification Search
CPC ...... G02B 15/00; G02B 15/14; G02B 15/15; G02B 15/16; G02B 15/161; G02B 15/163; G02B 15/173; G02B 15/20; G02B 15/24; G02B 15/28; G02B 27/64; G02B 27/646
See application file for complete search history.

(56) References Cited

U.S. PATENT DOCUMENTS

| | | | | |
|---|---|---|---|---|
| 5,257,135 A | * | 10/1993 | Kohno et al. ................. | 359/689 |
| 5,598,299 A | | 1/1997 | Hayakawa | |
| 5,715,088 A | * | 2/1998 | Suzuki ................ | G02B 15/173 |
| | | | | 359/554 |
| 5,774,267 A | * | 6/1998 | Kodama ............. | G02B 27/646 |
| | | | | 359/557 |
| 6,061,180 A | | 5/2000 | Hayakawa | |

(Continued)

FOREIGN PATENT DOCUMENTS

| | | |
|---|---|---|
| CN | 102053345 A | 5/2011 |
| JP | 2000-047107 A | 2/2000 |

OTHER PUBLICATIONS

European Search Report issued in corresponding application No. 14152325.8 on May 8, 2014.

(Continued)

*Primary Examiner* — Thong Nguyen
(74) *Attorney, Agent, or Firm* — Carter, DeLuca, Farrell & Schmidt, LLP

(57) ABSTRACT

A zoom lens including, in order from an object side: a positive first lens unit; a negative second lens unit; and a positive third lens unit, in which: an interval between the first and second lens units is increased, and an interval between the second and third lens units is decreased during zooming from a wide angle end to a telephoto end; the second lens unit is an image stabilizing lens unit which moves with a component of motion in a direction perpendicular to an optical axis whereby an imaging position is moved in the direction of motion perpendicular to the optical axis; and a focal length of an entire system at the wide angle end, a focal length of the first lens unit, and a movement amount of the first lens unit during zooming from the wide angle end to the telephoto end are each set appropriately.

12 Claims, 16 Drawing Sheets

(56) References Cited

U.S. PATENT DOCUMENTS

| | | | |
|---|---|---|---|
| 7,471,462 B2* | 12/2008 | Hatada | G02B 15/173 359/676 |
| 8,049,968 B2 | 11/2011 | Yamanaka et al. | |
| 8,537,471 B2 | 9/2013 | Uchida et al. | |
| 2009/0251794 A1 | 10/2009 | Adachi et al. | |
| 2011/0007403 A1* | 1/2011 | Matsuo | G02B 15/173 359/684 |
| 2011/0102905 A1 | 5/2011 | Harada | |
| 2011/0157719 A1 | 6/2011 | Yoneyama | |
| 2012/0200940 A1* | 8/2012 | Ohmoto | 359/683 |

OTHER PUBLICATIONS

Chinese Office Action issued in corresponding application No. CN201410032742.2 dated Sep. 17, 2015.

* cited by examiner

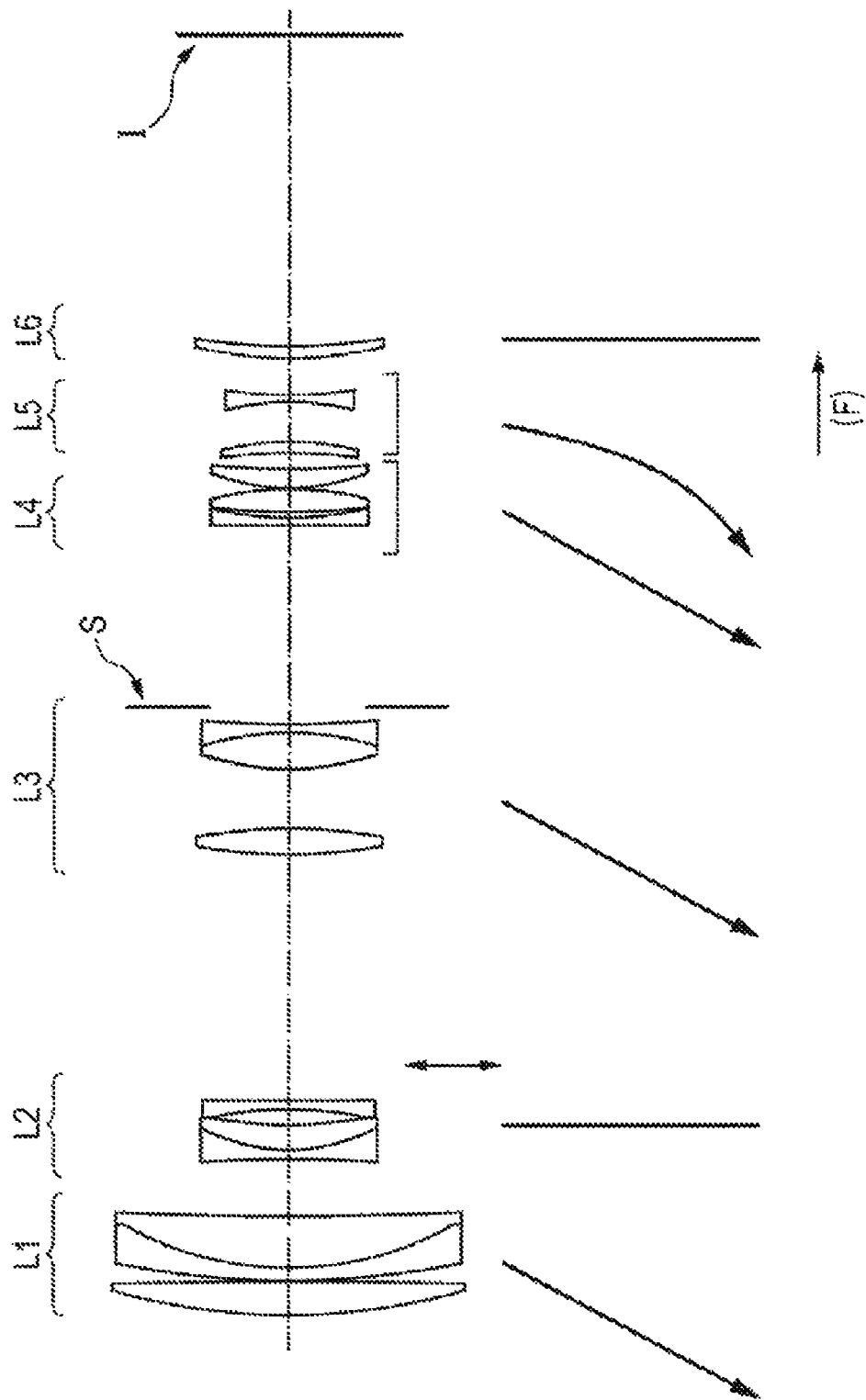

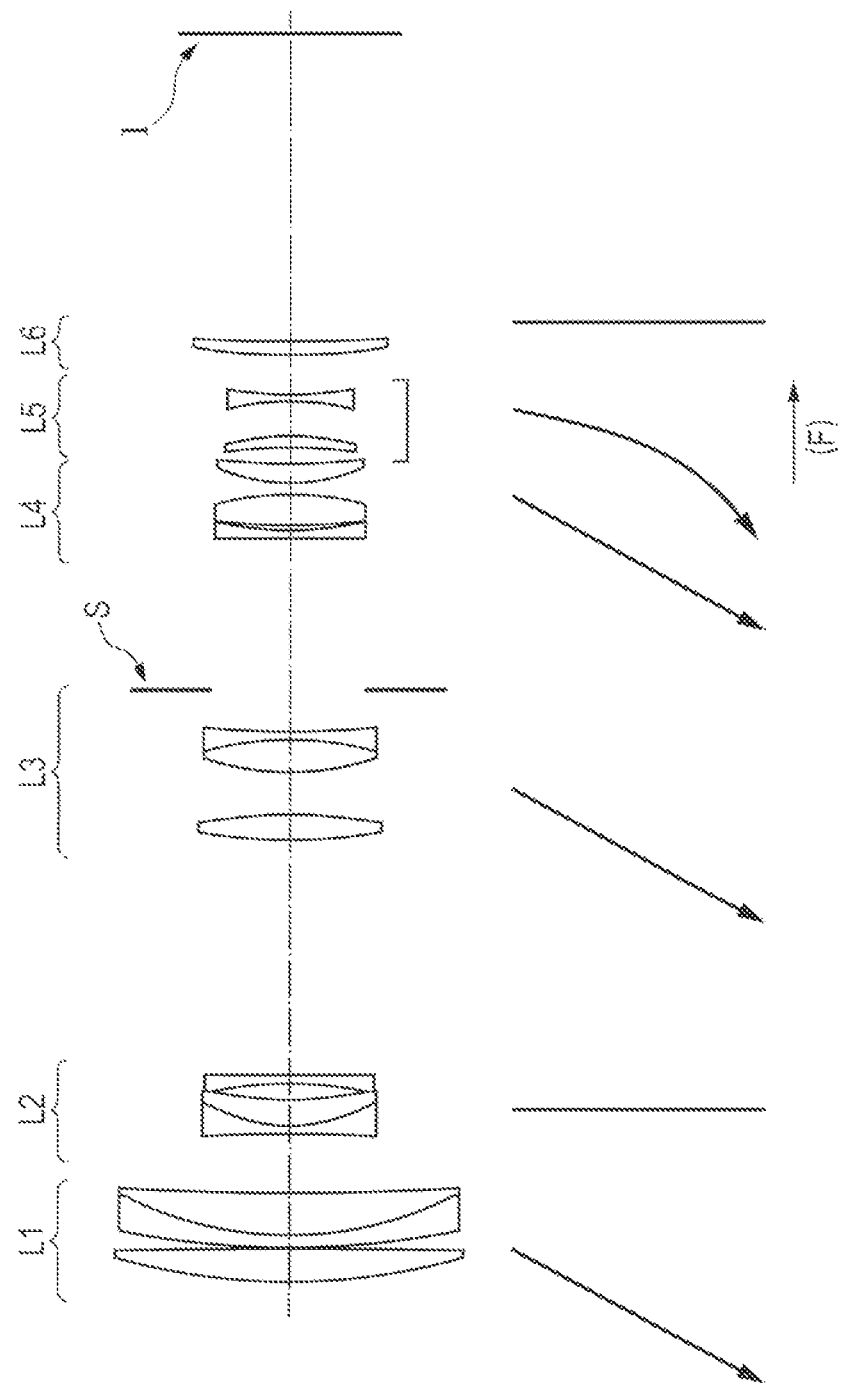

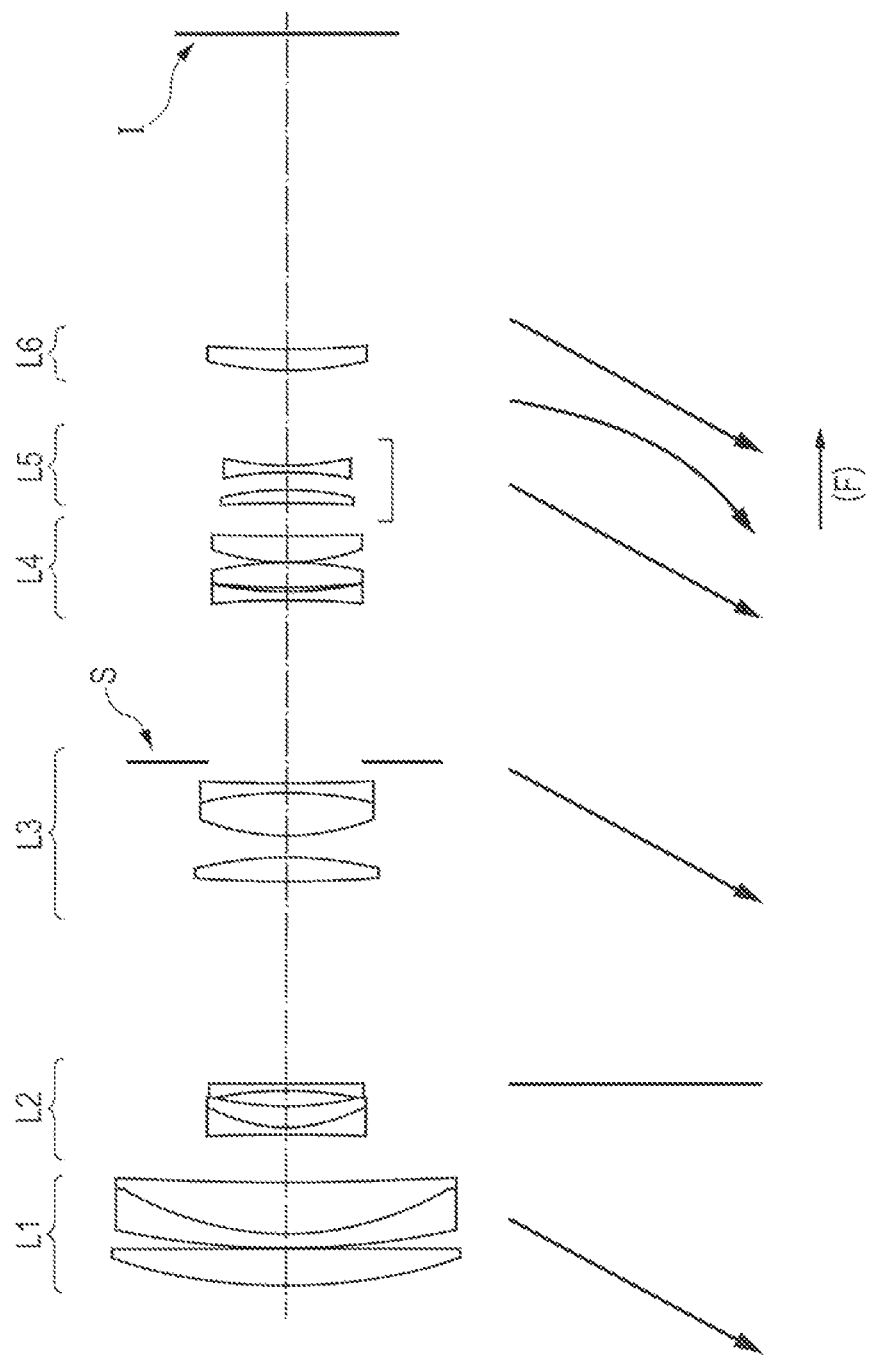

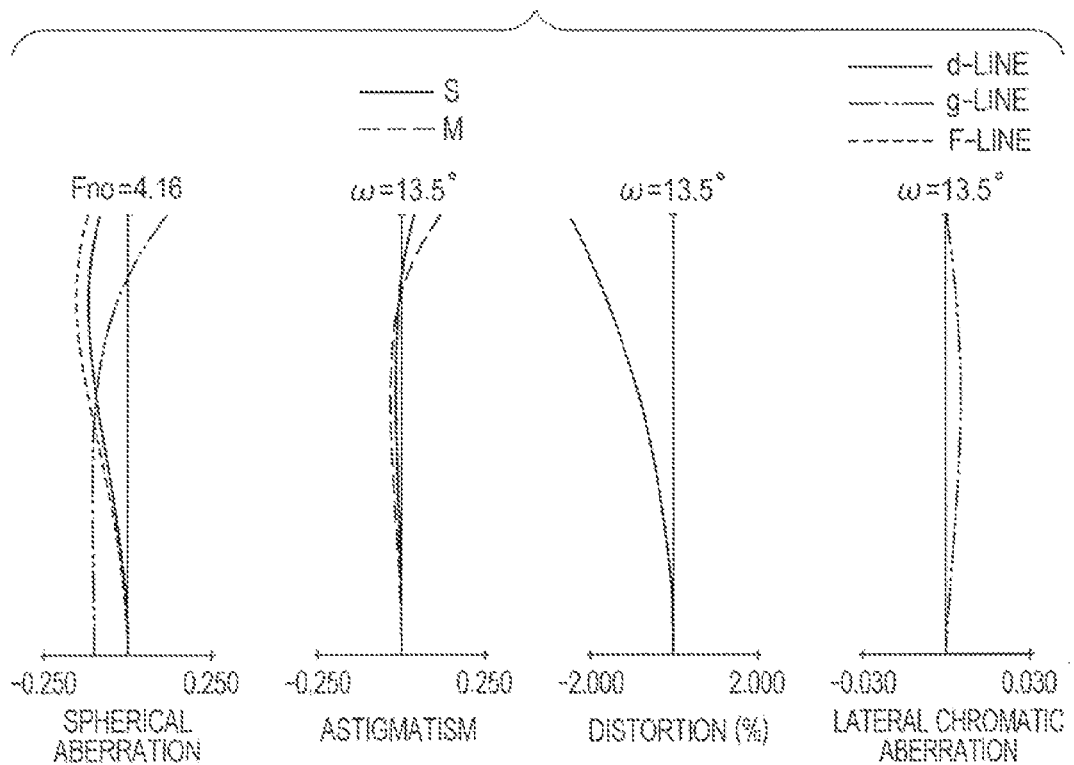
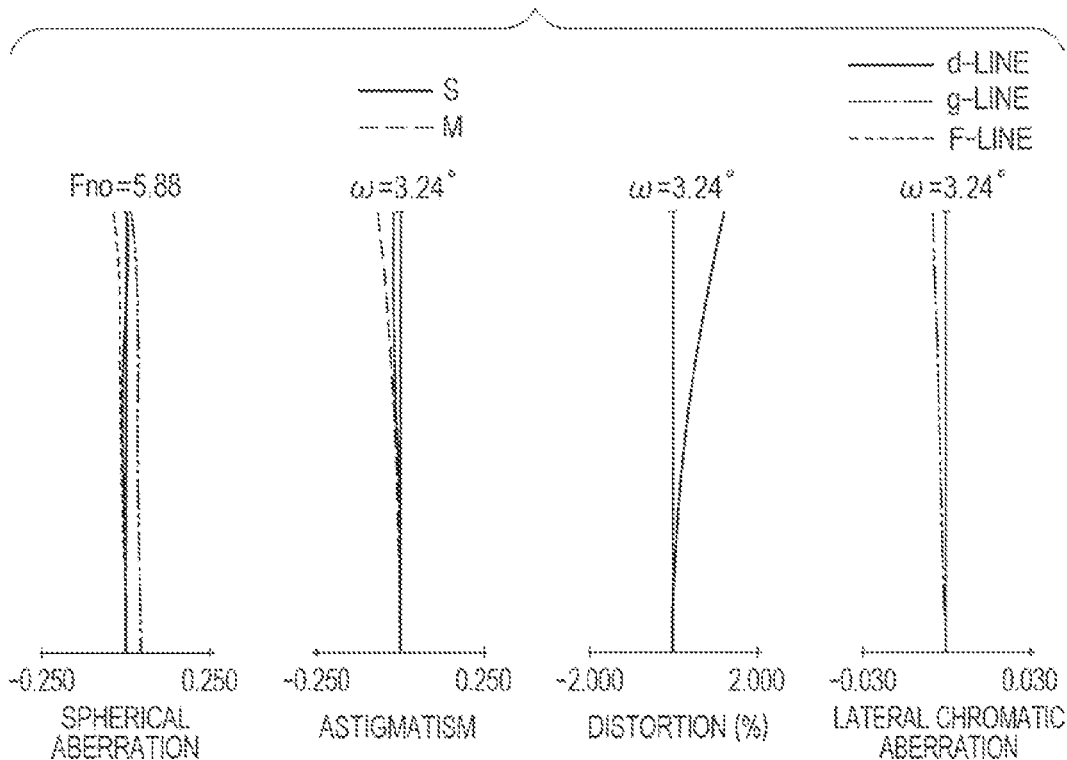

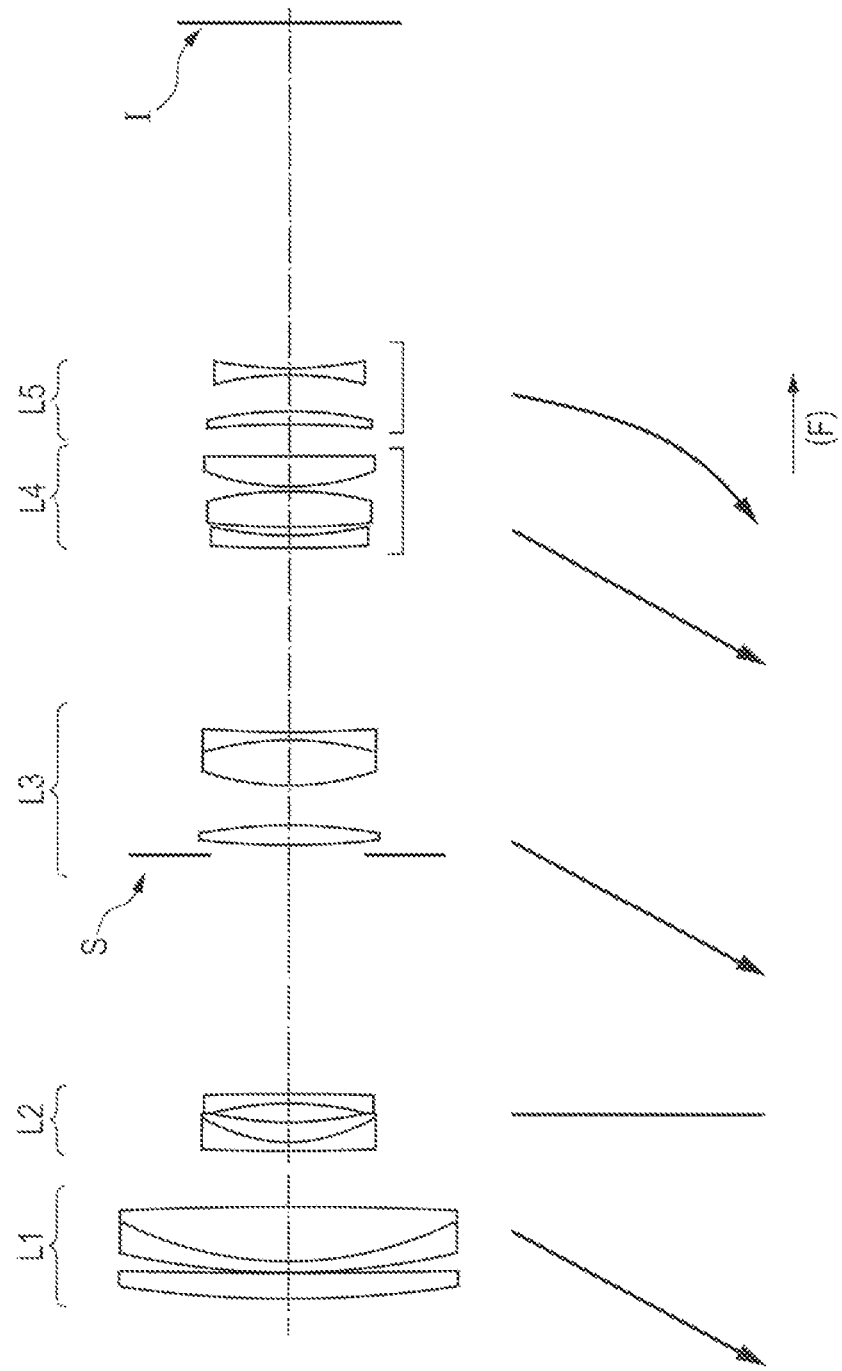

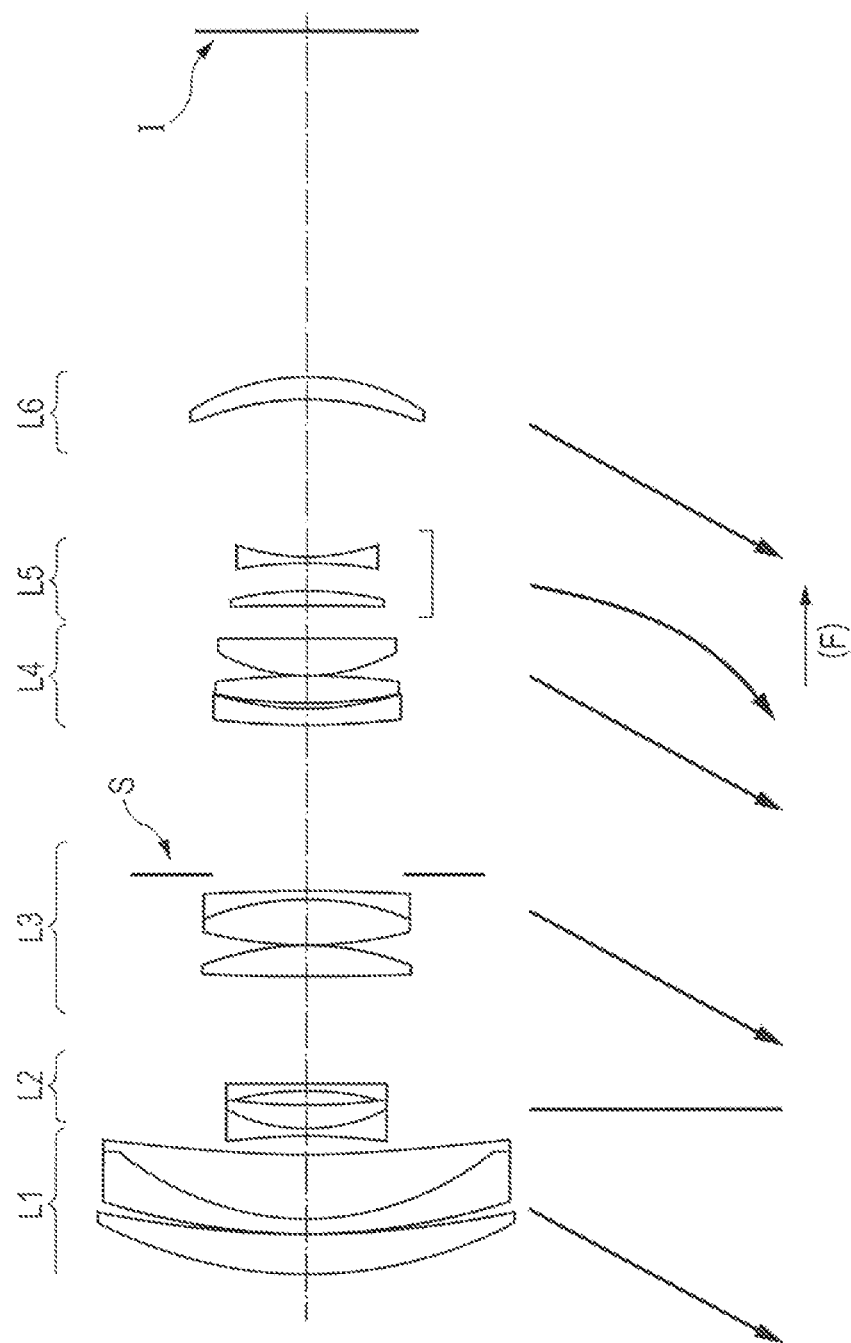

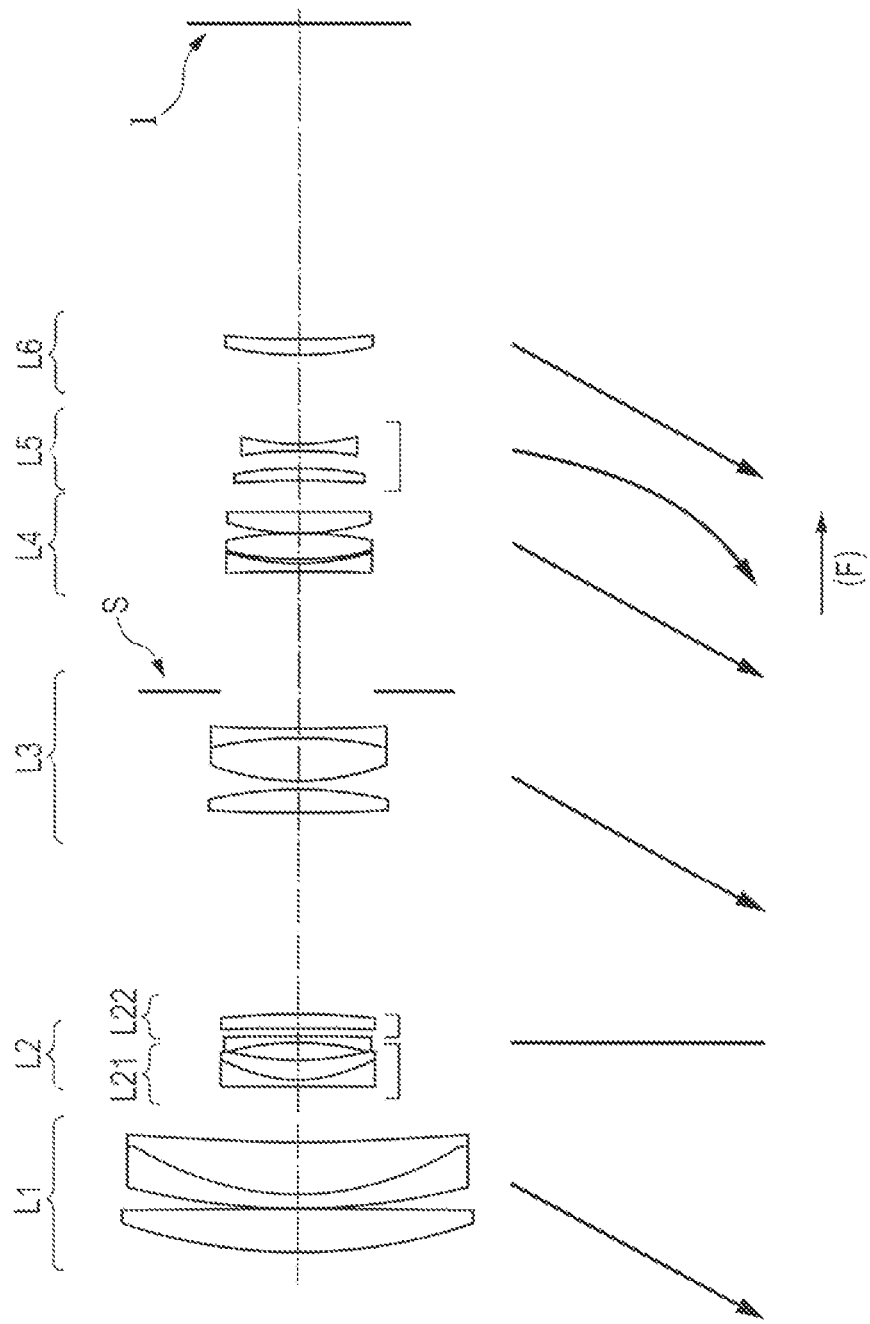

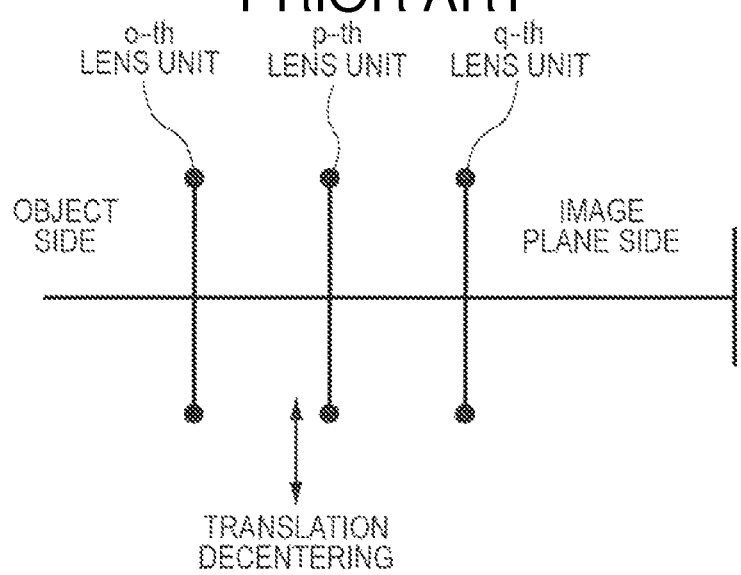

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are particularly suitable for an image pickup apparatus using a solid-state image pickup element, such as a video camera, an electronic still camera, a broadcasting camera, or a monitor camera.

Description of the Related Art

In photography, shaking causes a blur in a picked-up image. There are proposed various imaging optical systems having an image stabilization function for reducing the blur of a picked-up image.

In general, a mechanism for reducing the blur of a picked-up image by vibrating a part of lens units of the imaging optical system is required to have a large correction amount of the blur of a picked-up image and to have a small movement amount of a lens unit to be vibrated for correcting the blur of a picked-up image (image stabilizing lens unit). Further, the entire imaging optical system is required to be small in size. In addition, when the image stabilizing lens unit is decentered, if many decentering aberrations such as decentering coma, decentering astigmatism, decentering chromatic aberration, and decentering field curvature are generated, the image is blurred.

For instance, when many decentering distortions are generated, a movement amount of the picked-up image becomes different between on an optical axis and in a peripheral portion of a screen. For this reason, when the image stabilizing lens unit is decentered for correcting the blur of a picked-up image the optical axis, the same phenomenon as the blur of a picked-up image occurs in the peripheral portion of the screen, which causes conspicuous deterioration of optical characteristics.

As described above, it is required that deterioration of image quality is small when the image stabilizing lens unit is decentered. In addition, in order to downsize the entire apparatus, it is required that decentering sensitivity of the image stabilizing lens unit (a ratio $\Delta X/\Delta H$ of a correction amount $\Delta X$ of image blur to a unit movement amount $\Delta H$) is large. Further, it is required that the image stabilizing lens unit itself has a small size and a light weight.

Hitherto, there is known a telephoto type zoom lens in which some lens units are moved as an image stabilizing lens unit so as to have a component in a direction perpendicular to the optical axis so that an imaging positron is moved in the direction perpendicular to the optical axis for image stabilization.

U.S. Pat. No. 7,471,462 discloses performing the image stabilization by a second lens unit in a three-unit zoom lens including, in order from an object side to an image side, a first lens unit to a third lens unit respectively having positive, negative, and positive refractive powers, and in a four-unit zoom lens including, in order from the object side to the image side, a first lens unit to a fourth lens unit respectively having positive, negative, positive, and positive refractive powers. Japanese Patent Application Laid-Open No. 2000-047107 discloses performing the image stabilization by a second lens unit in a six-unit zoom lens including, in order from the object side to the image side, a first lens unit to a sixth lens unit respectively having positive, negative, positive, negative, positive, and negative refractive powers. Other than that, there is known a telephoto type zoom lens having a high zoom ratio using an inner focus type.

U.S. Pat. No. 8,049,968 discloses a zoom lens including, in order from the object side to the image side, a first lens unit to a fifth lens unit respectively having positive, negative, positive, positive, and negative refractive powers, in which the lens units are moved during zooming, and the fifth lens unit is used for focusing. U.S. Pat. No. 8,537,471 discloses a zoom lens including, in order from the object side to the image side, a first lens unit to a sixth lens unit respectively having positive, negative, positive, positive, negative, and positive refractive powers, in which the first, third, fourth, and fifth lens units are moved during zooming, and focusing is performed by a small-size and lightweight lens unit as a part of the fifth lens unit. In addition, U.S. Pat. No. 8,537,471 discloses performing the image stabilization by a part of the fifth lens unit.

SUMMARY OF THE INVENTION

According to one embodiment of the present invention, there is provided a zoom lens, including, in order from an object side to an image side: a first lens unit having a positive refractive power; a second lens unit having a negative refractive power; and a third lens unit having a positive refractive power, in which: the first lens unit, the second lens unit and the third lens unit are configured so that an interval between the first lens unit and the second lens unit is increased, and an interval between the second lens unit and the third lens unit is decreased, during zooming from a wide angle end to a telephoto one of the zoom lens; the second lens unit is an image stabilizing lens unit which is configured to move with a component of motion in a direction perpendicular to an optical axis whereby an imaging position is moved in the direction of motion perpendicular to the optical axis; and the following conditional expressions are satisfied:

$$0.85 < |\Delta L1|/fw < 1.10, \text{ and}$$

$$2.10 < f1/fw < 2.80,$$

where fw represents a focal length of an entire system at the wide angle end, f1 represents a focal length of the first lens unit, and $\Delta L1$ represents a movement amount of the first lens unit during zooming from the wide angle end to the telephoto end of the zoom lens.

Further features of the present invention will become apparent from the following description of embodiments with reference to the attached drawings.

BRIEF DESCRIPTION OF THE DRAWINGS

FIG. 1 is a lens cross-sectional view at a wide angle end according to Embodiment 1 of the present invention.

FIG. 3 is a lens cross-sectional view at the wide angle end according to Embodiment 2 of the present invention.

FIG. 5 is a lens cross-sectional view at the wide angle end according to Embodiment 3 of the present invention.

FIG. 6A is an aberration diagram at the wide angle end according to Embodiment 3 of the present invention.

FIG. 6B is an aberration diagram at the telephoto end according to Embodiment 3 of the present invention.

FIG. 7 is a lens cross-sectional view at the wide angle end according to Embodiment 4 of the present invention.

FIG. 11 is a lens cross-sectional view at the vide angle end according to Embodiment 6 of the present invention.

FIG. 13 is a lens cross-sectional view at the wide angle end according to embodiment 7 of the present invention.

FIG. 15 is a schematic diagram of a lens structure illustrating decentering aberration correction in the present invention.

DESCRIPTION OF THE EMBODIMENTS

Now, embodiments of the present invention are described in detail with reference to the attached drawings. A zoom lens of the present invention includes, in order from an object side to an image side, a first lens unit having a positive refractive power, a second lens unit facing a negative refractive power, and a third lens unit having a positive refractive power. During zooming from a wide angle end to a telephoto end, an interval between the first lens unit and the second lens unit increases, while an interval between the second lens unit and the third lens unit decreases. A whole or a part of the second lens unit is an image stabilizing lens unit, which moves to have a component in a direction perpendicular to an optical axis so as to move an imaging position in the direction perpendicular to the optical axis.

Figure 2A:
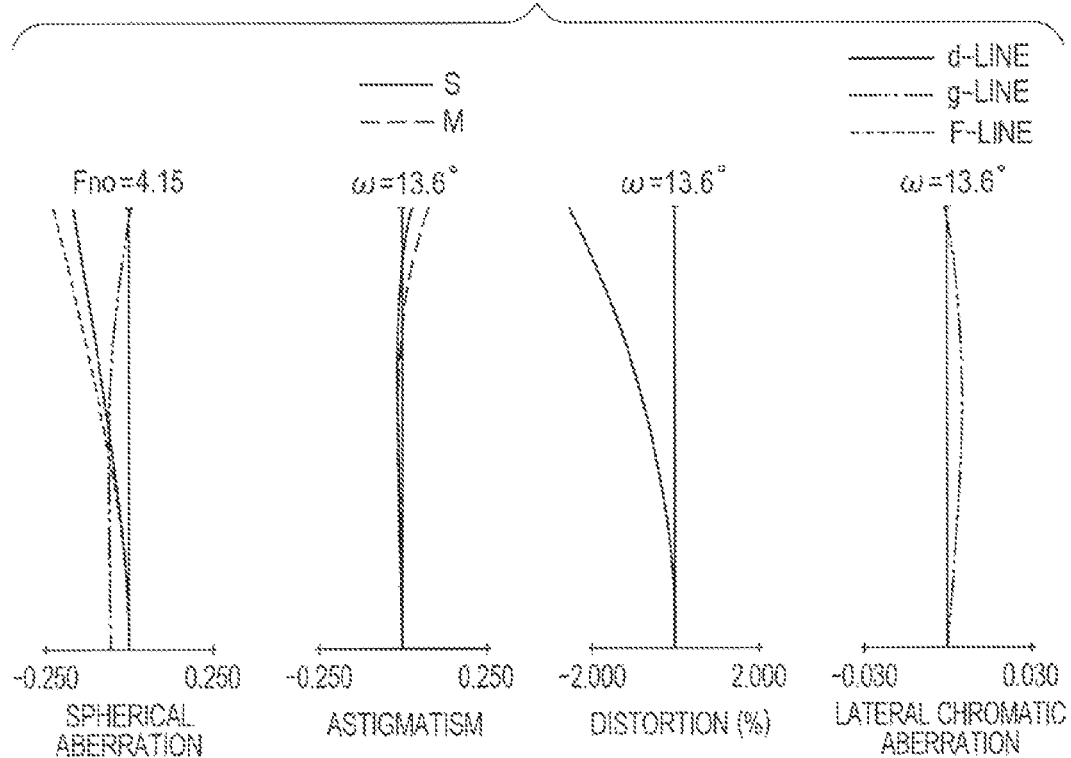
FIG. 2A is an aberration diagram at the wide angle end according to Embodiment 1 of the present invention.
Figure 2B:
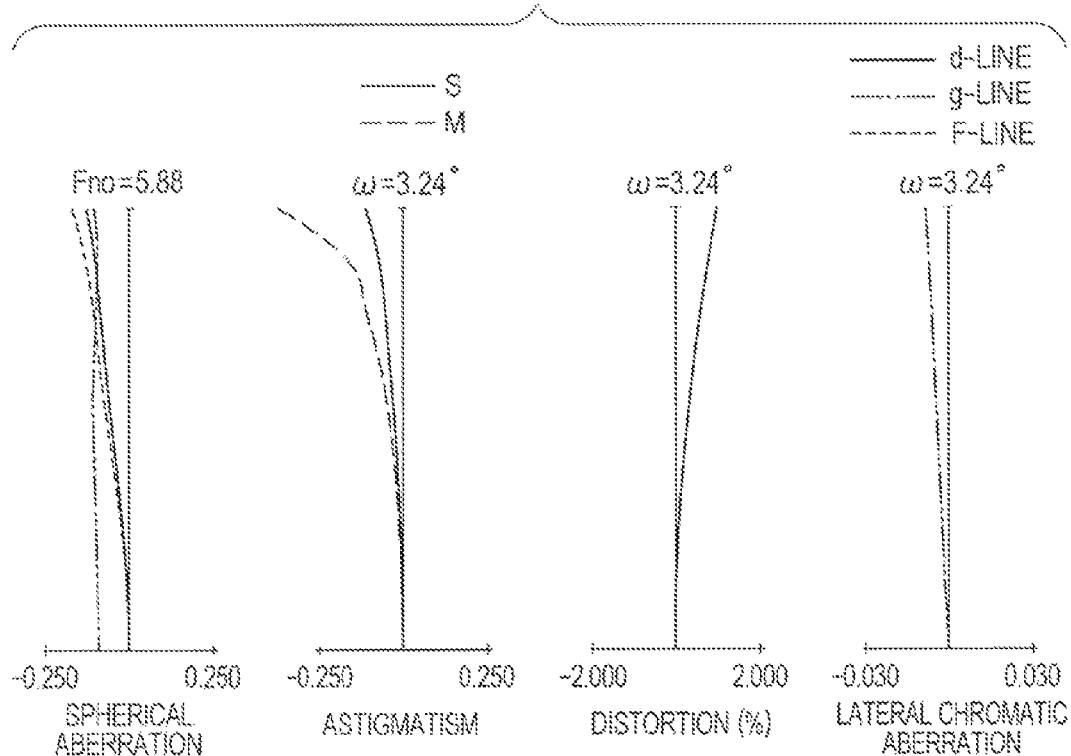
FIG. 2B is an aberration diagram at a telephoto end according to Embodiment 1 of the present invention.
Figure 4A:
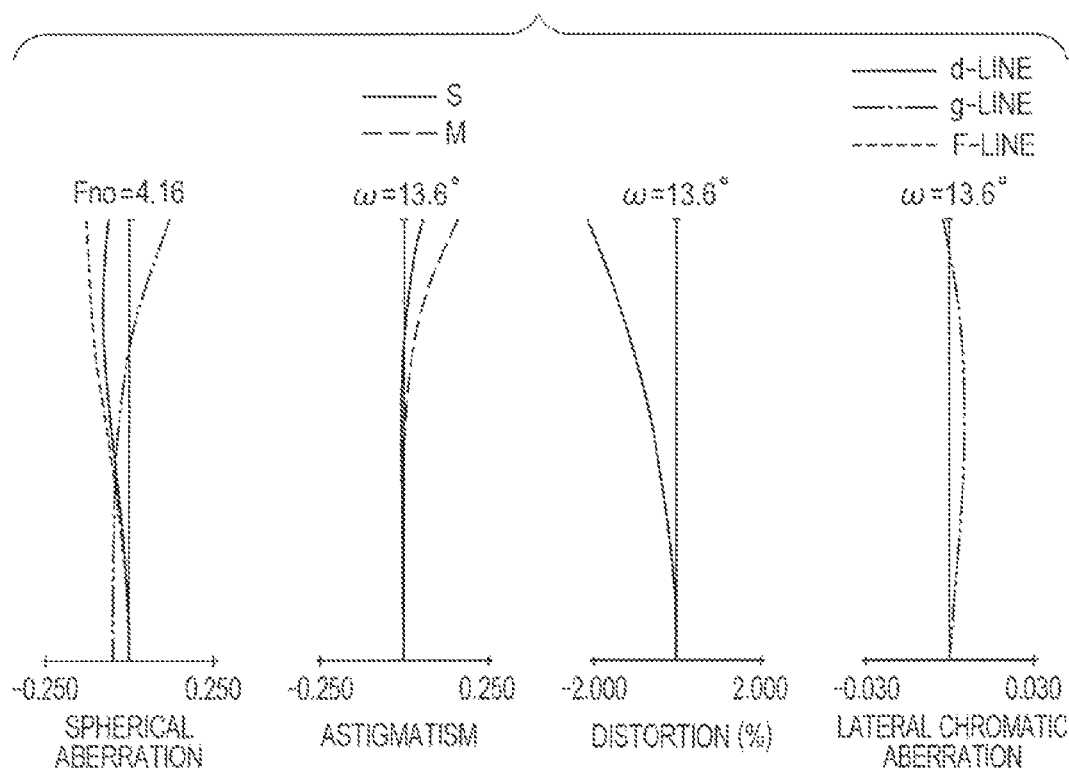
FIG. 4A is an aberration diagram at the wide angle end according to Embodiment 2 of the present invention.
Figure 4B:
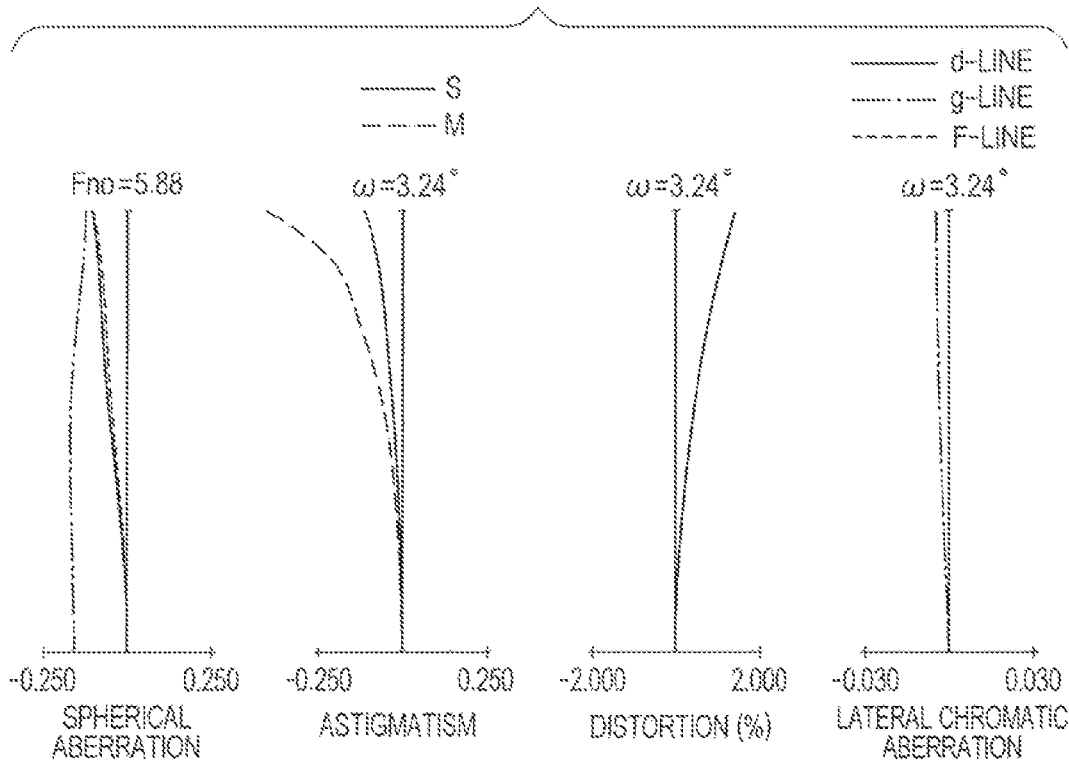
FIG. 4B is an aberration diagram at the telephoto end according to Embodiment 2 of the present invention.

FIG. 1 is a lens cross-sectional view of a zoom lens at a wide angle end (short focal length end) according to Embodiment 1 of the present invention. FIGS. 2A and 2B are aberration diagrams of the zoom lens at the wide angle end and at a telephoto end (long focal length end) respectively according to Embodiment 1. FIG. 3 is a lens cross-sectional view of a zoom lens at the wide angle end according to Embodiment 2 of the present invention. FIGS. 4A and 4B are aberration diagrams of the zoom lens at the wide angle end and at the telephoto end respectively according to Embodiment 2. FIG. 5 is a over cross-sectional view of a zoom lens at the wide angle end according to Embodiment 3 of the present invention. FIGS. 6A and 6B are aberration diagrams of a zoom lens at the wide angle end and at the telephoto end respectively according to Embodiment 3.

Figure 8A:
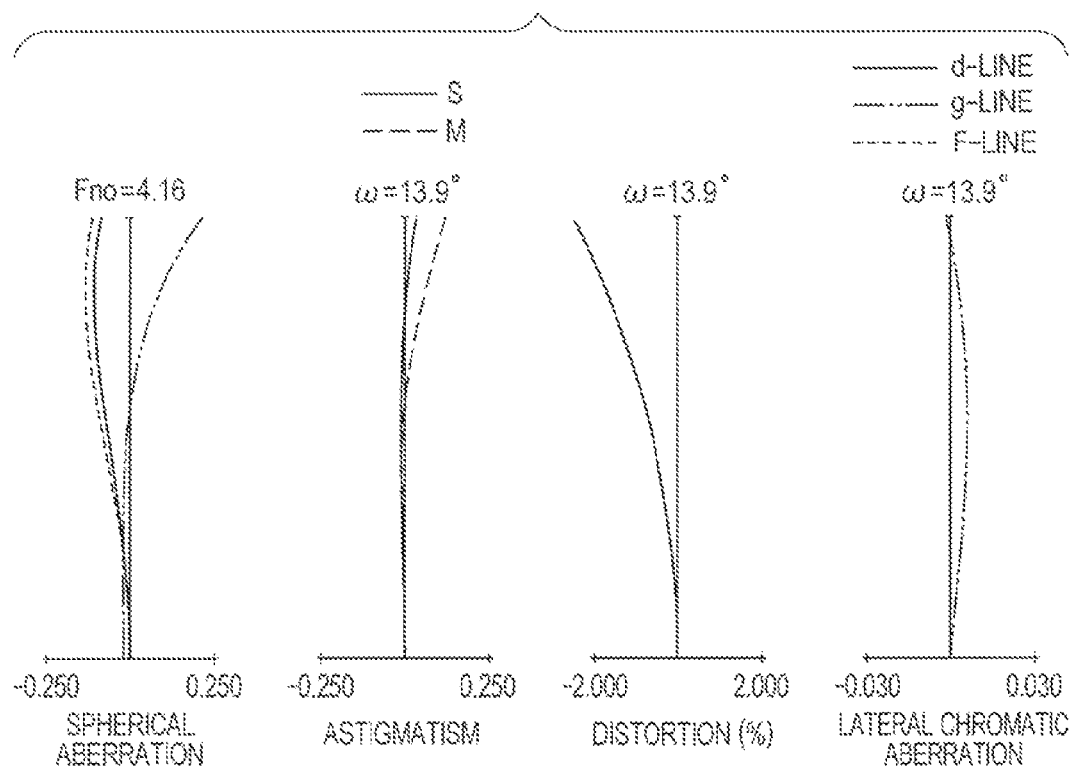
FIG. 8A is an aberration diagram at the wide angle end according to Embodiment 4 of the present invention.
Figure 8B:
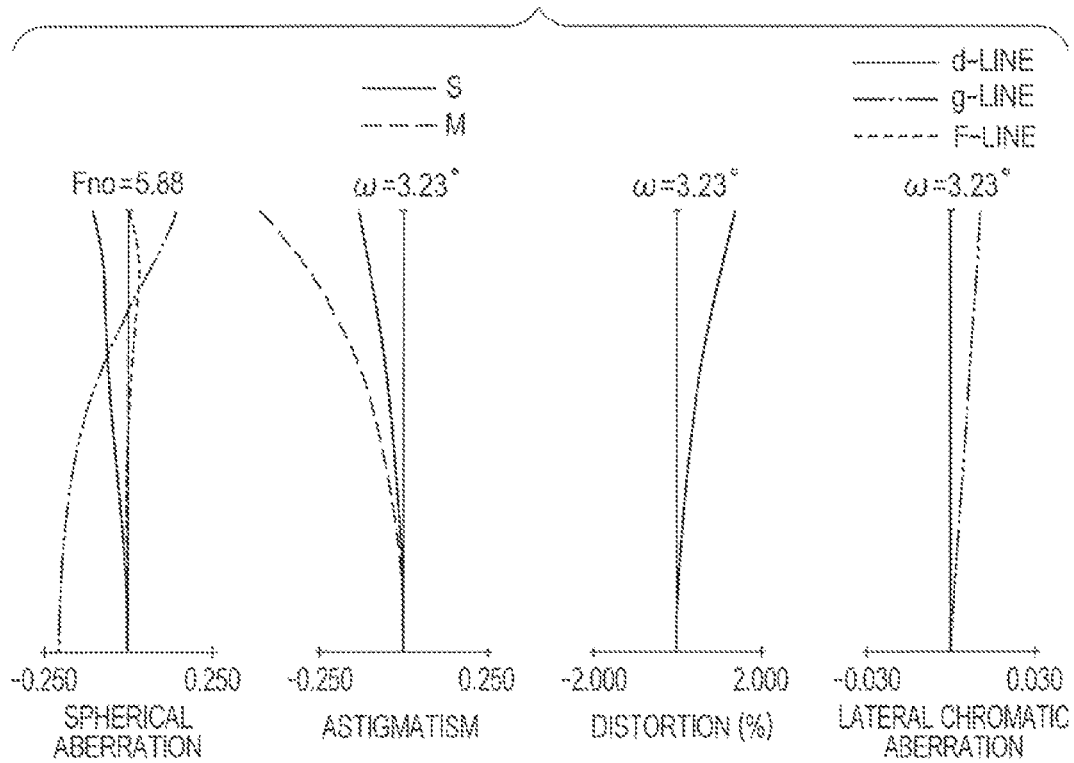
FIG. 8B is an aberration diagram at the telephoto end according to Embodiment 4 of the present invention.
Figure 9:
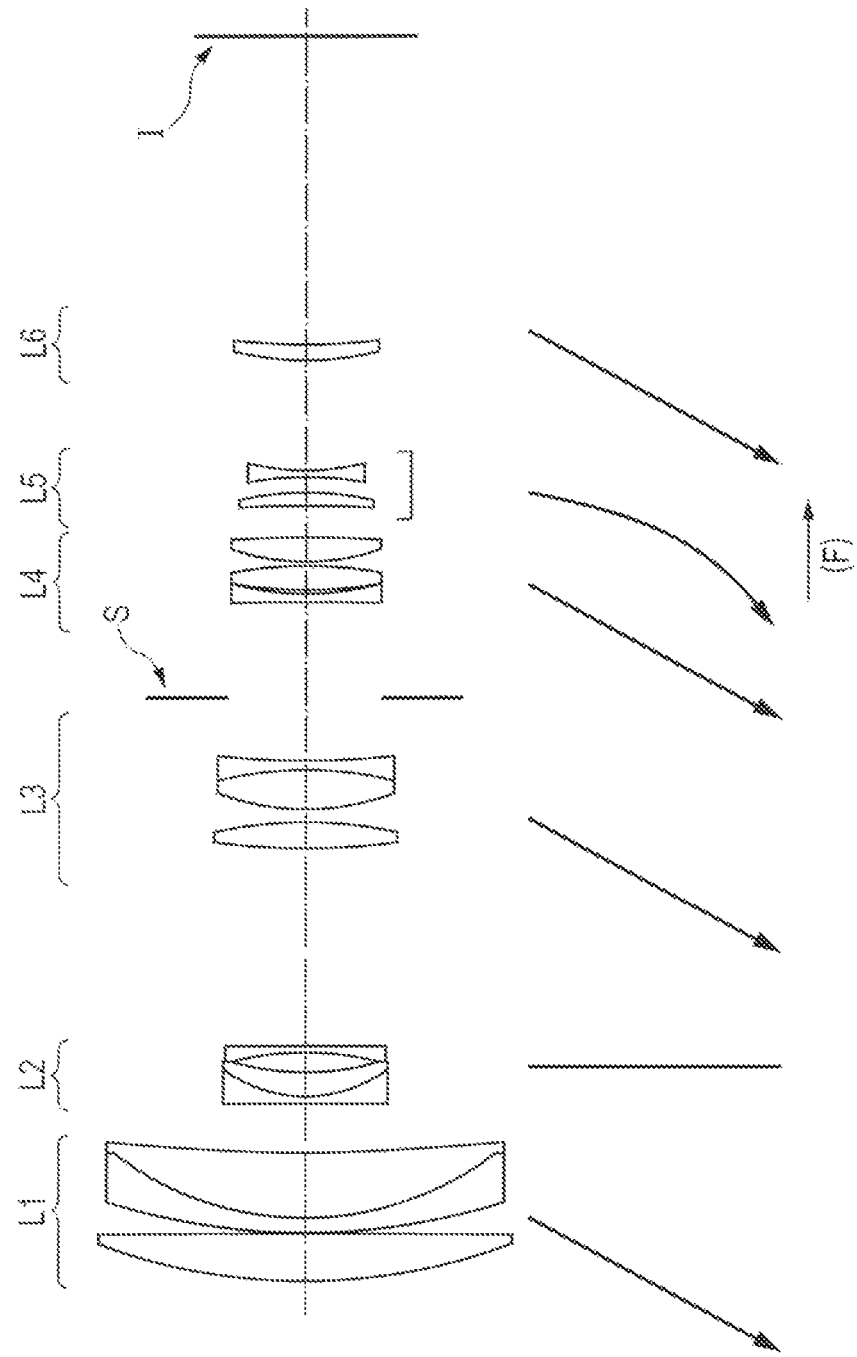
FIG. 9 is a lens cross-sectional view at the wide angle end according to Embodiment 5 of the present invention.
Figure 10A:
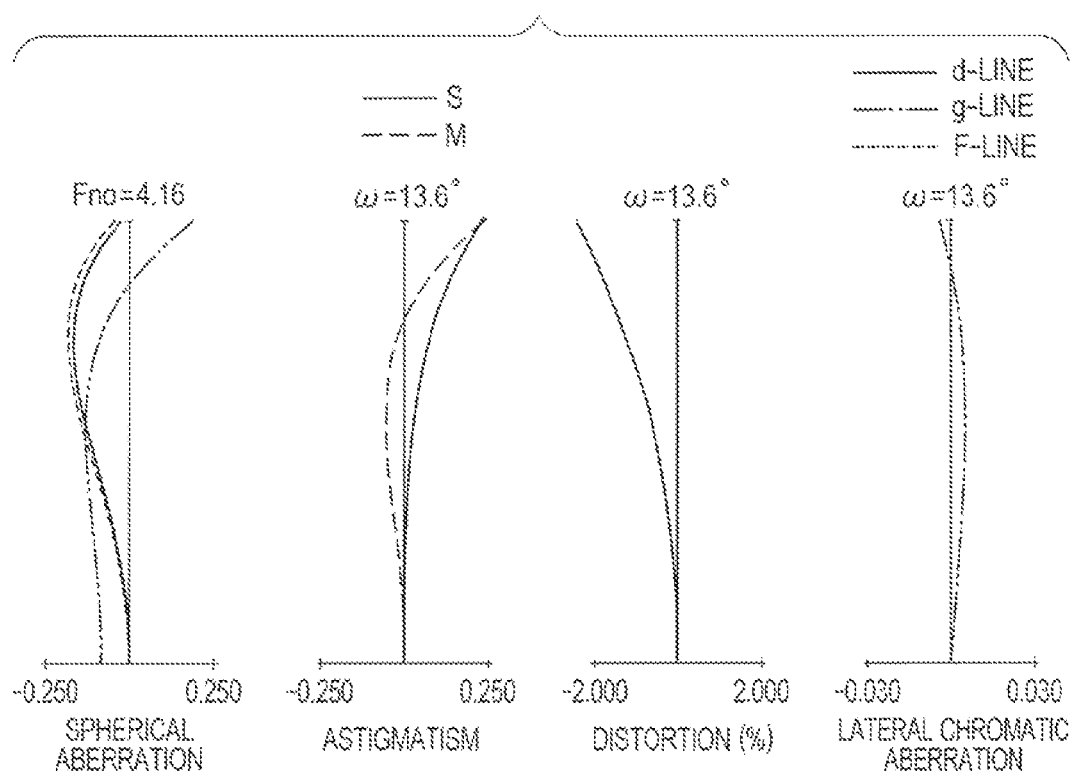
FIG. 10A is an aberration diagram at the wide angle end according to Embodiment 5 of the present invention.
Figure 10B:
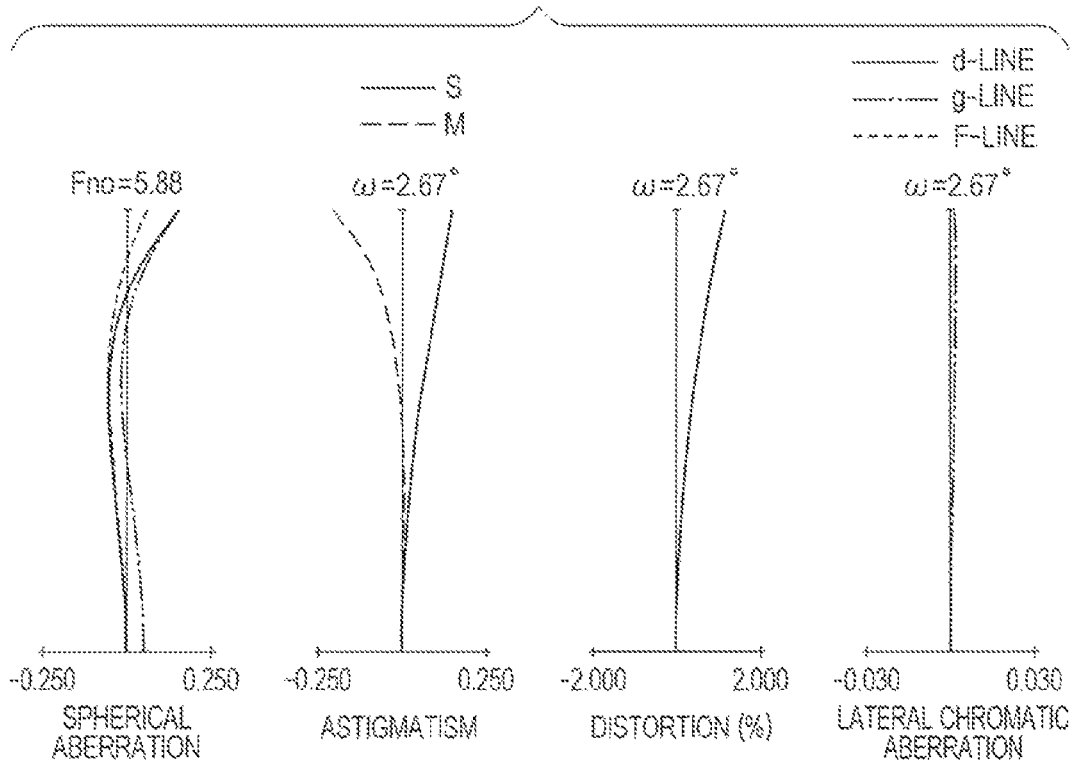
FIG. 10B is an aberration diagram at the telephoto end according to Embodiment 5 of the present invention.

FIG. 7 is a lens cross-sectional view of a zoom lens at the wide angle end according to Embodiment 4 of the present invention. FIGS. 8A and 8B are aberration diagrams of the zoom lens at the wide angle end and at the telephoto end respectively according to Embodiment 4. FIG. 9 is a lens cross-sectional view of a zoom lens at the wide angle end according to Embodiment 5 of the present invention. FIGS. 10A and 10B are aberration diagrams of the zoom lens at the wide angle end and at the telephoto end respectively according to Embodiment 5.

Figure 12A:
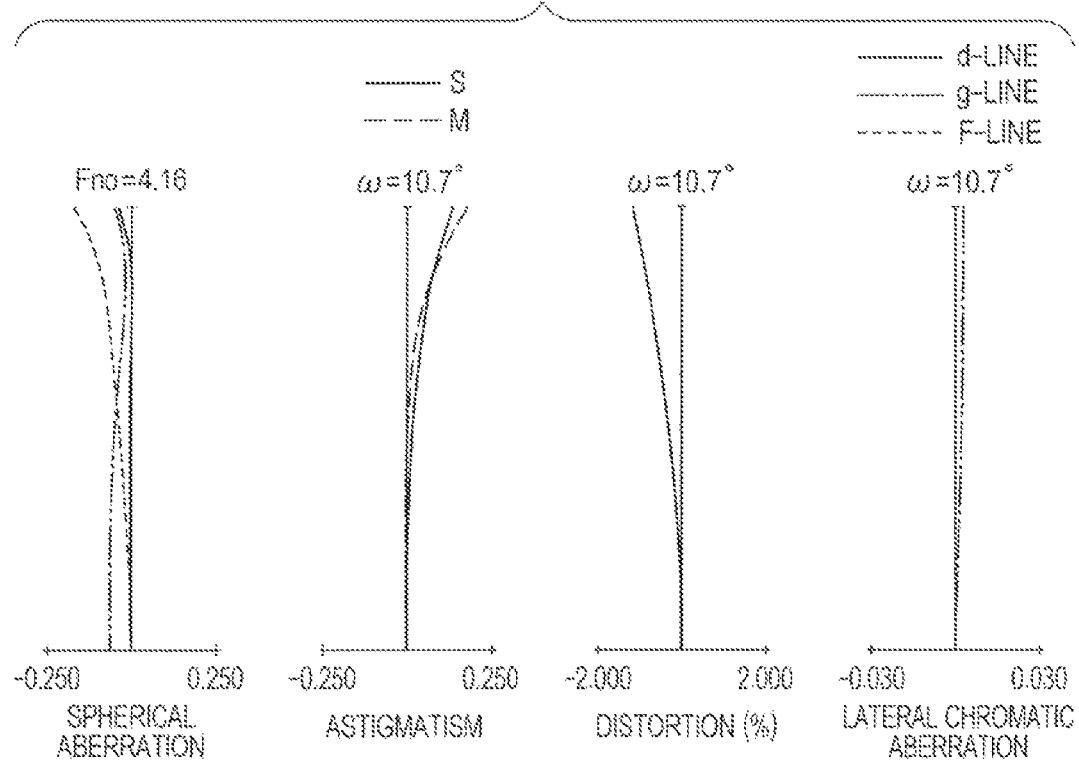
FIG. 12A is an aberration diagram at the wide angle end according to Embodiment 6 of the present invention.
Figure 12B:
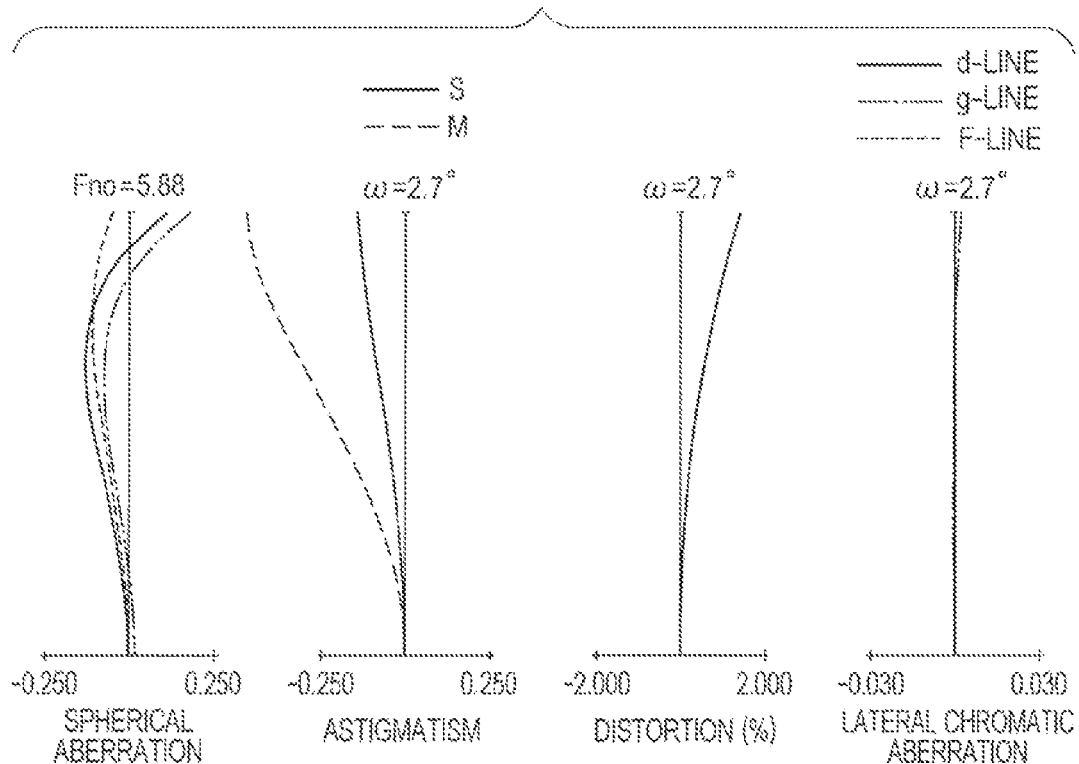
FIG. 12B is an aberration diagram at the telephoto end according to Embodiment 6 of the present invention.
Figure 14A:
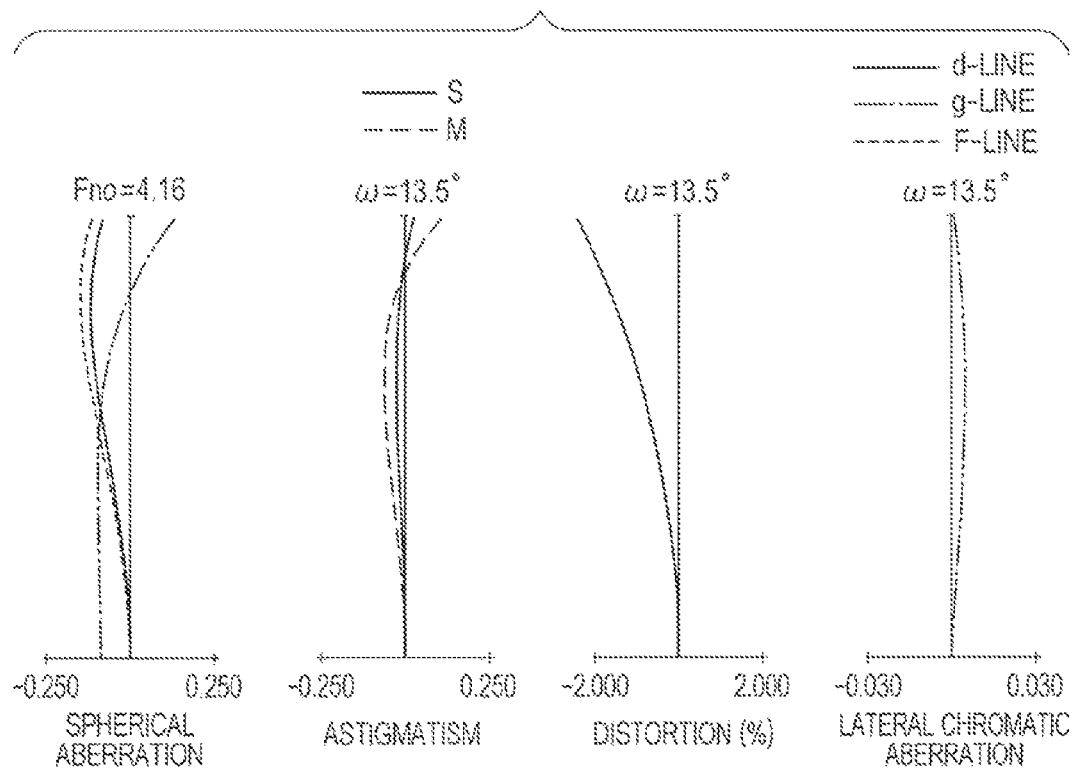
FIG. 14A is an aberration diagram at the wide angle end according to Embodiment 7 of the present invention.
Figure 14B:
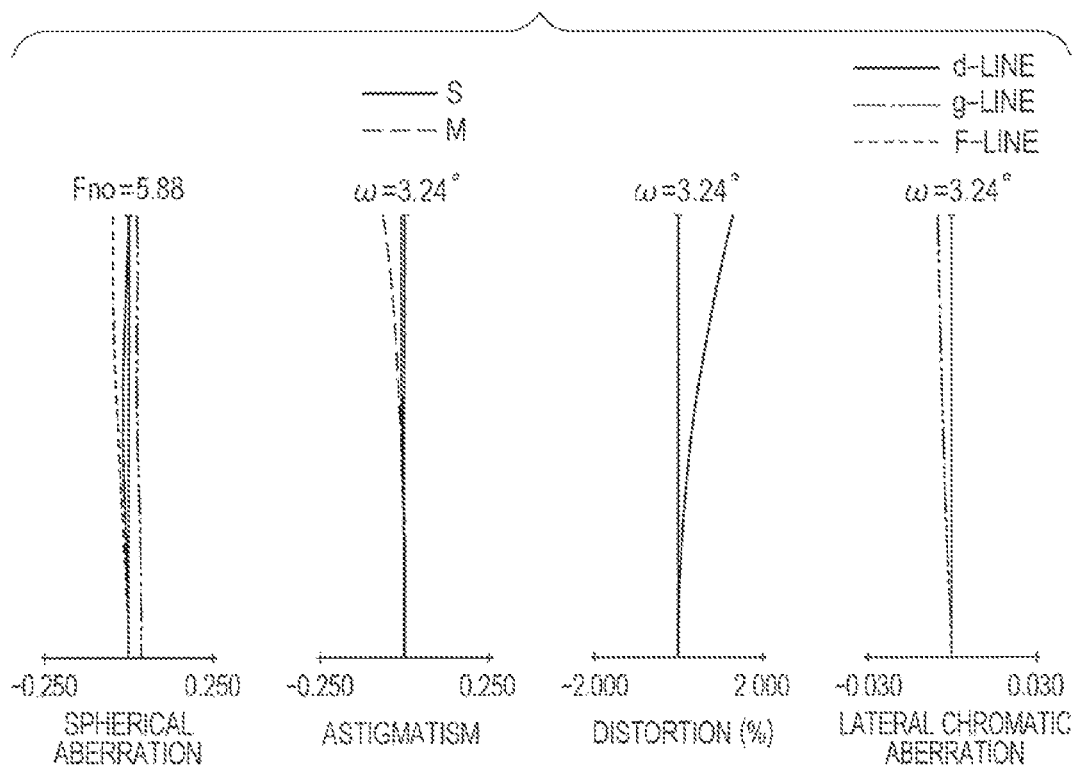
FIG. 14B is an aberration diagram at the telephoto end according to Embodiment 7 of the present invention.
Figure 17:
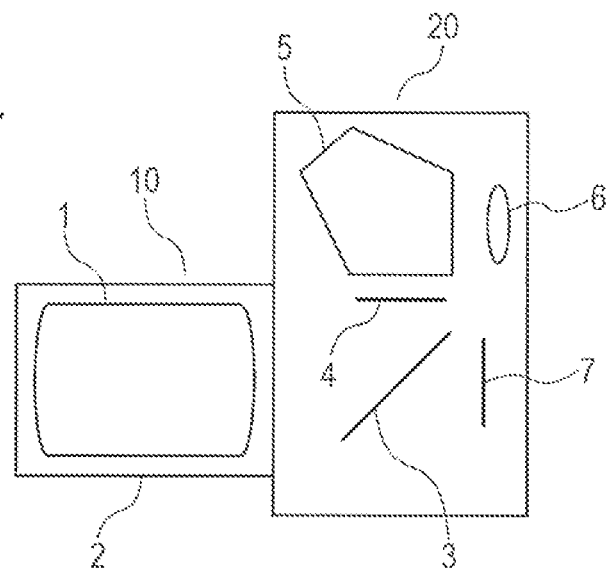
FIG. 17 is a schematic diagram of a main part when a zoom lens of the present invention is applied to a digital camera.

FIG. 11 is a lens cross-sectional view of a zoom lens at the wide angle end according to Embodiment 6 of the present invention. FIGS. 12A and 12B are aberration diagrams of the zoom lens at the wide angle end and as the telephoto end respectively according to Embodiment 6. FIG. 13 is a lens cross-sectional view of a zoom lens at the wide angle end according to Embodiment 7 of the present invention. FIGS. 14A and 14B are aberration diagrams of the zoom lens at the wide angle end and at the telephoto end respectively according to Embodiment 7. FIG. 17 is a schematic diagram of a main part of a camera (image pickup apparatus) equipped with the zoom lens of the present invention. The zoom lens of each embodiment is an imaging lens system that is used for an image pickup apparatus such as a video camera, a digital camera, and a silver-halide film camera.

The left side of the lens cross-sectional view is a subject side, that is, the object side (front side), and the right side is the image side (rear side). The lens cross-sectional view illustrates a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power. Further, the lens cross-sectional view illustrates an aperture stop S.

As an image plane I, a photosensitive surface corresponding to an imaging plane of a solid-state image pickup element (photoelectric transducer element) is disposed when the imaging lens system is used as an imaging optical system of a video camera or a digital still camera, while a photosensitive surface corresponding to a film plane is disposed in a case of a silver-halide film camera. The solid-state image pickup element is, for embodiment, a charge coupled device (CCD) sensor or a complementary metal oxide semiconductor (CMOS) sensor. In the spherical aberration diagram, a d-line (wavelength of 587.56 nm), a g-line (wavelength of 435.8 nm), and an F-line (wavelength of 486.1 nm) are shown. In the astigmatism diagram, M and S represent a meridional image plane and a sagittal image plane, respectively. The distortion is expressed by the d-line. Lateral chromatic aberration is expressed by the g-line.

Symbol ω represents a half angle of field (half value of an angle of imaging field), and Fno represents an F-number. Further, in each embodiment described below, the wide angle end and the telephoto end refer to zoom positions when the magnification varying lens unit is positioned at each end of a mechanically movable range along the optical axis. In each embodiment, an arrow indicates a movement locus during zooming from the wide angle end to the telephoto end or during focusing.

The zoom lens of the present invention includes, in order from the object side to the image side, the first lens unit L1 having a positive refractive power, the second lens unit L2 having a negative refractive power, the third lens unit L3 having a positive refractive power, the fourth lens unit L4 having a positive refractive power, and the fifth lens unit L5 having a negative refractive power. Embodiments 1 to 3 and Embodiments 5 to 7 includes a sixth lens unit L6 having a positive refractive power on the image side of the fifth lens unit L5.

In Embodiments 1 and 2, the second lens unit L2 and the sixth lens unit L6 do not move during zooming, while the first lens unit L1 and the third lens unit L3 to the fifth lens unit L5 move during zooming. In Embodiment 3 and Embodiments 5 to 7, the second lens unit L2 does not move during zooming, while the first lens suit L1 and the third lens unit L3 to the sixth lens unit L6 move during zooming. In Embodiment 4, the second lens unit L2 does not move during zooming, while the first lens unit L1 and the third lens unit L3 to the fifth lens unit L5 move during zooming.

In focusing from an object at infinity to an object at short distance, the fifth lens unit L3 moves toward the image side. In Embodiments 1 to 6, the second lens unit L2 is the image stabilizing lens unit, which moves to have a component in the direction perpendicular to the optical axis so as to change the imaging position of the entire system in the direction perpendicular to the optical axis.

In Embodiment 7, the second lens unit L2 includes a first sub-lens unit L21 and a second sub-lens unit L22. The first sub-lens unit L21 is the image stabilizing lens unit, which moves to have a component in the direction perpendicular to the optical axis so as to change the imaging position of the entire system in the direction perpendicular to the optical axis. The image stabilizing lens unit includes a positive lens and a negative lens and includes three or fewer lenses as a whole.

Next, optical characteristics of the image stabilization function in the zoom lens according to the present invention are described. In general, when a part of an optical system is a movable lens unit and is translation-decentered from the optical axis so as to correct image blur, decentering aberration is generated so that imaging performance is deteriorated.

Therefore, a description is next made of generation of the decentering aberration when a movable lens unit in an optical system having an arbitrary refractive power arrangement is moved in the direction perpendicular to the optical axis for correcting the image blur, from a standpoint of the aberration theory, based on a method proposed by Matsui in "The 23rd meeting of the Japan Society of Applied Physics (1962)".

Figure 16A:
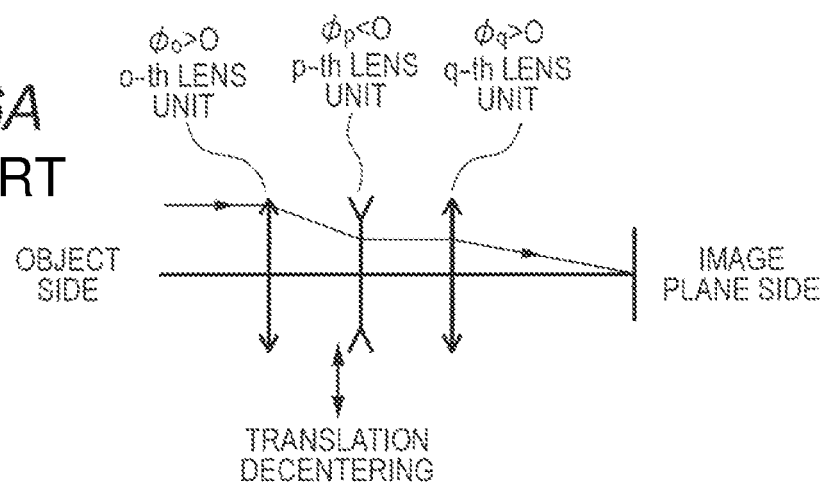
FIGS. 16A and 16B are schematic diagrams of a lens structure illustrating the decentering aberration correction in the present invention.
Figure 16B:
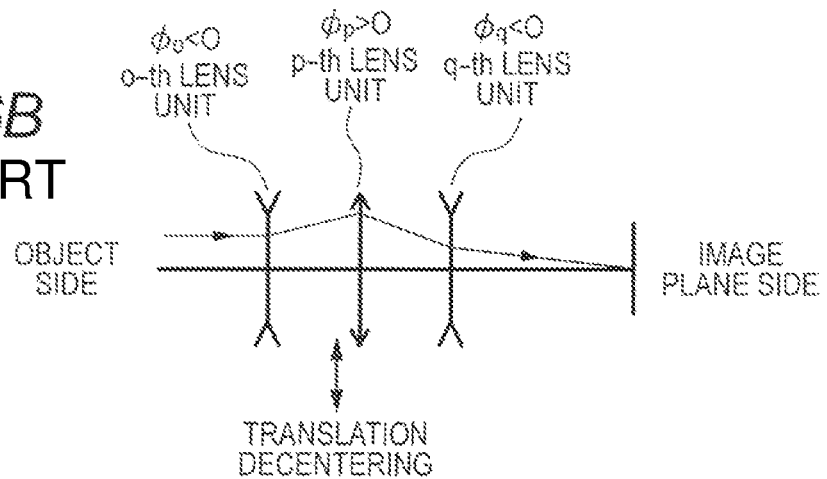

FIGS. 15, 16A, and 16B are explanatory diagrams of the refractive power arrangement when a part of the lens units P in the optical system is translation-decentered. An aberration amount $\Delta Y1$ of the entire system when the part of the lens units P in the optical system is translation-decentered by a distance E is a sum of an aberration amount $\Delta Y$ before decentering and a decentering aberration amount $\Delta Y(E)$ generated by decentering as shown in Equation (a).

Here, the aberration amount $\Delta Y$ is expressed by using spherical aberration (I), coma (II), astigmatism (III), Petzval sum (P), and distortion (V). In addition, the decentering aberration $\Delta Y(E)$ is expressed as shown in Equation (C) by using primary decentering coma (IIE), primary decentering astigmatism (IIIE), primary decentering field curvature (PE), primary decentering distortion (VE1), primary decentering additional distortion (VE2), and primary origin shift ($\Delta E$). In addition, aberrations ($\Delta E$) to (VE2) in Equations (d) to (i) are expressed as follows in the optical system in which the lens unit P is translation-decentered.

Aberration coefficients of the spherical aberration (I), the coma (II), the astigmatism (III), the Petzval sum (P), and the distortion (V) of the lens unit P are $I_p$, $II_p$, $III_p$, $P_p$, and $V_p$, respectively. Further, in the same manner, when regarding lens units disposed on the image plane side of the lens unit P as a single q-th lens unit as a whole, the aberration coefficients are $I_q$, $II_q$, $III_q$, $P_q$, and $V_q$, respectively. Here, incident angles of light beams to the lens unit P are $\alpha_p$ and $\alpha a_p$.

$$\Delta Y1 = \Delta Y + \Delta Y(E) \tag{a}$$

$$\Delta Y = -\frac{1}{2\alpha_k}[(N_1\tan\omega)^3\cos\phi\omega \cdot V + \tag{b}$$
$$(N_1\tan\omega)^2 R\{2\cos\phi\omega\cos(\phi_R - \phi\omega) \cdot III + \cos\phi_R(III + P)\} +$$
$$(N_1\tan\omega)R^2\{2\cos\phi_R\cos(\phi_R - \phi\omega) + \cos\phi\omega\} \cdot II + R^3\cos\phi \cdot I]$$

$$\Delta Y(E) = -\frac{E}{2\alpha_k}\langle (N_1\tan\omega)^2\{(2+\cos2\phi\omega)(VE1) - (VE2)\} + \tag{c}$$
$$2(N_1\tan\omega)R[\{2\cos(\phi_R - \phi\omega) + \cos(\phi_R + \phi\omega)\}(IIIE) +$$
$$\cos\phi_R\cos\phi\omega \cdot (PE)] + R^2(2+\cos2\phi_R)(IIE)\rangle - \frac{E}{2\alpha_k}(\Delta E)$$

$$(\Delta E) = -2(\alpha_p - \alpha_p) \tag{d}$$
$$= -2h_p\phi_p$$

$$(IIE) = \alpha a_p II_q - \alpha_p(II_p - II_q) - \alpha a_p I_p + \alpha a_p(I_p + I_q) \tag{e}$$
$$= h_p\phi_p - \alpha_p II_p - (h a_p \phi_p I_q - \alpha a_p I_p)$$

$$(IIIE) = \alpha_p III_q - \alpha_p(III_p + III_q) - \alpha a_p II_q + \alpha a_p(II_p + II_q) \tag{f}$$
$$= h_p\phi_p III_q - \alpha_p III_p - (h a_p \phi_p II_q - \alpha a_p II_p)$$

$$(PE) = \alpha_p P_q - \alpha_p(P_p + P_q) \tag{g}$$
$$= h_p\phi_p P_q - \alpha_p P_p$$

$$(VE1) = \alpha_p V_q - \alpha_p(V_p + V_q) - \alpha a_p III_q + \alpha a_p(III_p + III_q) \tag{h}$$
$$= h_p\phi_p V_q - \alpha_p V_p - (h a_p \phi_p III_q - \alpha a_p III_p)$$

$$(VE2) = \alpha a_p P_q - \alpha a_p(P_p + P_q) \tag{i}$$
$$= h a_p \phi_p P_q - \alpha a_p P_p$$

As understood from the above, in order to reduce generation of the decentering aberration, it is necessary to set the aberration coefficients $I_p$, $II_p$, $III_p$, $P_p$, and $V_p$ of the lens unit P to be small values or to set the aberration coefficients in good balance so as to be canceled by each other as shown in Equations (a) to (i).

Next, an optical action of the image stabilization function in the zoom lens of the present invention is described with reference to a model intended to be used in an optical system, which corrects a shift of the picked-up image by driving in a decentering manner the partial lens unit (p-th unit) in the imaging optical system illustrated in FIG. 15 in the direction perpendicular to the optical axis.

First, in order to realize sufficiently large shift correction by a sufficiently small decentering drive amount, it is necessary to set the primary origin shift ($\Delta E$) to a sufficiently large value. Based on this, a condition of correcting the primary decentering field curvature (PE) is considered. In FIG. 15, the imaging optical system is constituted of three lens units including, in order from the object side, an o-th unit, the p-th unit, and a q-th unit, in which the p-th unit is moved in parallel in the direction perpendicular to the optical axis for correcting the image blur.

Here, refractive powers of the o-th unit, the p-th unit, and the q-th unit are denoted by $\phi_o$, $\phi_p$, and $\phi_q$, respectively. Incident angles of a paraxial marginal ray and an off-axial ray to each lens unit are denoted by $\alpha$ and $\alpha_a$, respectively. Incident heights of the paraxial marginal ray and the off-axial ray are denoted by h and ha, respectively. Further, the same suffixes of o, p, and q are also used for the incident angles, the incident heights, and the aberration coefficients.

In addition, it is assumed that each lens unit is constituted of a small number of lenses, and each aberration coefficient has a tendency of insufficient correction. On this presupposition, Petzval sums of the lens units are attended. Then, the Petzval sums $P_o$, $P_p$, and $P_q$ of the lens units are proportional to the refractive powers $\phi_o$, $\phi_p$, and $\phi_q$ of the lens units, respectively, and the following relationships are substantially satisfied.

$$P_o = C\phi_o \quad (j)$$

$$P_p = C\phi_p \quad (k)$$

$$P_q = C\phi_q \text{ (where } C \text{ is a constant)} \quad (l)$$

Therefore, the primary decentering field curvature (PE) that is generated when the p-th unit is translation-decentered can be expressed as follows from the above equations.

$$(PE) = C\phi_p)h_p\phi_q - \alpha_p) \quad (m)$$

Therefore, in order to correct the primary decentering field curvature (PE), $\phi_p=0$ or $\phi_q=\alpha_p/h_p$ needs to be satisfied. However, when $\phi_p=0$ is satisfied, the primary origin shift (ΔE) becomes zero and hence the shift correction cannot be performed. Therefore, a solution satisfying $\phi_q=\alpha_p/h_p$ needs to be derived. In other words, because $h_p>0$ is satisfied, it is at least necessary that αp and $\phi_q$ have the same sign.

(a) In Case of $\alpha_p>0$

In order to correct the decentering field curvature, $\phi_q>0$ needs to be satisfied, and consequently $\phi_o>0$ is satisfied. Further in this case, when $\phi_p>0$ is satisfied, $0<\alpha_p<\alpha'_p<1$ is satisfied. Then, the primary origin shift (ΔE) is expressed as follows.

$$(\Delta E) = -2(\alpha_p' - \alpha_p) > -2 \quad (n)$$

In other words, decentering sensitivity (a ratio of a shift amount of the blur of a picked-up image to a unit shift amount of the decentering lens unit) becomes smaller than one. Further, as described above, when $\phi_p=0$ is satisfied, the decentering sensitivity becomes zero. Therefore, in this case, $\phi_p<0$ needs to be satisfied.

(b) In Case of $\alpha_p<0$

In order to correct the primary decentering field curvature (PE), $\phi_q<0$ needs to be satisfied, and consequently $\phi_o<0$ is satisfied. Then, further consequently, $\phi_p>0$ is satisfied. Thus, in order to set the primary origin shift (ΔE) to a sufficiently large value while enabling to correct the primary decentering field curvature (PE), the refractive power arrangement of the optical system needs to be as follows.

TABLE 1

| Lens unit | | o | q | r |
|---|---|---|---|---|
| Refractive power arrangement | a | Positive | Negative | Positive |
| | b | Negative | Positive | Negative |

The lens structures of the refractive power arrangements shown in Table 1 are illustrated in FIGS. 16A and 16B, respectively.

The zoom lens of the present invention utilizes these refractive power arrangements. Next, features of the lens structure of the zoom lens according to the present invention are described.

In the optical system in general, refractive powers of individual lens units are appropriately set so as to realize a compact lens structure of the entire system and to appropriately correct various aberrations. In general, when a part of lens units of the optical system is translation-decentered in the direction perpendicular to the optical axis so as to correct a shift of a picked-up image, there is an advantage that the decentering sensitivity can be set to be sufficiently large. In addition, it is preferred to select the lens unit to be translation-decentered because the decentering aberration can be corrected relatively easily with such lens unit. On the other hand, in order to realize a small size of the apparatus itself, it is desired to select a lens unit having a relatively small lens diameter as the lens unit to be translation-decentered.

From the viewpoint described above, the zoom leas of the present invention adopts the refractive power arrangement illustrated in FIG. 16A.

As described above, the zoom lens of the present invention includes, in order from the object side to the image side, the first lens unit L1 having a positive refractive power, the second lens unit L2 having a negative refractive power, and the third lens unit L3 having a positive refractive power, in which intervals between lens units are changed during zooming. In addition, a whole or a part of the second lens unit is moved in the direction having a component in the direction perpendicular to the optical axis for correcting image blur, and hence good optical performance is maintained in image stabilization.

In the zoom lens of the present invention, the first lens unit L1 has a predetermined refractive power, and further a movement amount of the first lens unit during zooming is set to be large. Thus, it becomes easy to reduce height of an axial ray entering the second lens unit L2, and as a result, the second lens unit L2 can be easily downsized and made lightweight.

Further, by utilizing a rear focus system in which a lens unit closer to the image side than the aperture stop S is used as a focus lens unit that moves during focusing, it is easy to secure the movement amount of the first lens unit L1 during zooming also in a lens barrel structure.

In each embodiment, the following conditional expressions are satisfied:

$$0.85 < |\Delta L1|/fw < 1.10 \quad (1), \text{ and}$$

$$2.10 < f1/fw < 2.80 \quad (2),$$

where fw represents a focal length of the entire system at the wide angle end, f1 represents a focal length of the first lens unit L1, and ΔL1 represents a movement amount of the first lens unit L1 from the vide angle end to the telephoto end during zooming. Here, the movement amount ΔL1 is a positional difference on the optical axis between the wide angle end and the telephoto end. In addition, a sign of the movement amount ΔL1 is negative when moving toward the object side and is positive when moving toward the image side.

$$l_{ieR} \in \{obj, bkg\}$$

$$l_{ieR} \in \{obj, bkg\}$$

The conditional expression (1) defines a movement amount of the first lens unit L1 during zooming from the wide angle end to the telephoto end. When an upper limit value of the conditional expression (1) is exceeded, the entire system becomes large at the telephoto end. In addition, when a lower limit value of the conditional expression (1) is exceeded, it is required to increase the refractive power of the first lens unit L1 for obtaining a predetermined zoom ratio. As a result, generation of various aberrations is increased, and further sensitivity in the decentering is increased so that production becomes difficult. It is preferred to set a value range of the conditional expression (1) as follows.

$$0.87 < |\Delta L1|/fw < 1.09 \tag{1a}$$

The conditional expression (2) defines a focal length of the first lens unit. When the upper limit value of the conditional expression (2) is exceeded, refractive power of the first lens unit L1 becomes too weak. A movement amount of the first lens unit L1 to obtain a predetermined zoom ratio is increased, and hence a size of the entire system is increased. In addition, when the lower limit value of the conditional expression (2) is exceeded, refractive power of the first lens unit L1 becomes too strong, and sensitivity in decentering becomes too high so that production becomes difficult. It is preferred to set a value range of the conditional expression (2) as follows.

$$2.10 < f1/fw < 2.40 \tag{2a}$$

In each embodiment, it is preferred to satisfy one or more of the following conditional expressions:

$$0.28 < |fvi/fw| < 0.60 \tag{3},$$

$$vd < 24 \tag{4},$$

$$0.015 < \theta gF - 0.6438 + 0.001682 \times vd < 0.100 \tag{5},$$

$$0.80 < f3/f4 < 1.1 \tag{6), and}$$

$$0.58 < SKw/fw < 0.90 \tag{7},$$

where fvi represents a focal length of the image stabilizing lens unit. The image stabilizing lens unit includes at least one positive lens, and vd and θgF respectively represent an Abbe constant and a partial dispersion ratio of material of the positive lens. Further, f3 represents a focal length of the third lens unit L3, f4 represents a focal length of the fourth lens unit L4, and SKw represents back focus at the wide angle end. Here, the Abbe constant vd, and the partial dispersion ratio θgF are defined by the following equations:

$$vd = (Nd-1)/(NF-NC), \text{ and}$$

$$\theta gF = (Ng-NF)/(NF-NC),$$

where Nd represents a refractive index of the material for the d-line, Ng represents a refractive index of the material for the g-line, NC represents a refractive index of the material for the C-line, and NF represents a refractive index of the material for the F-line.

Next, technical meanings of the conditional expressions are described. The conditional expression (3) defines the focal length of the image stabilizing lens unit corresponding to a whole or a part of the second lens unit L2. When the upper limit value of the conditional expression (3) is exceeded, the refractive power of the image stabilizing lens unit becomes too weak. Then, a shifting amount (movement amount) necessary for correcting image blur is increased, and as a result, the entire system becomes large. In addition, when the lower limit of the conditional expression (3) is exceeded, the refractive power of the image stabilizing lens unit becomes too strong. Then, the decentering aberration is increased in a case where the image stabilizing lens unit is constituted of a small number of lenses. In addition, when the number of lenses is increased for correcting the decentering aberration, the entire system becomes large. It is preferred to set the value range of the conditional expression (3) as follows.

$$0.29 < |fvi/fw| < 0.60 \tag{3a}$$

The conditional expressions (4) and (5) define the material of the positive lens in the image stabilizing lens unit. Because the second lens unit L2 has a negative refractive power, it is preferred to use a high dispersion material for the positive lens in consideration of achromatic condition of the lens unit. By using the material having characteristics of the partial dispersion ratio θgF satisfying the range of the conditional expression (5) correction of axial chromatic aberration of the entire system is effectively performed. Further, the material satisfying the ranges of the conditional expressions (4) and (5) has a relatively small specific gravity among materials positioned on the high dispersion side, and hence such material has advantages in reducing weight. It is preferred to set the value ranges of the conditional expressions (4) and (5) as follows.

$$vd < 23.9 \tag{4a}$$

$$0.016 < \theta gF - 0.6438 + 0.001682 \times vd < 0.060 \tag{5a}$$

It is more preferred to set the value range of the conditional expression (5a) as follows.

$$0.022 < \theta gF - 0.6438 + 0.001682 \times vd < 0.050 \tag{5b}$$

The conditional expression (6) defines a relationship between the focal lengths of the third lens unit L3 and the fourth lens unit L4. When the upper limit value of the conditional expression (6) is exceeded, the refractive power of the third lens unit L3 becomes too weak. Then, a diameter of the light beam entering the fourth lens unit is not decreased, and hence an effective diameter of the fourth lens unit L4 is increased.

In addition, when the lower limit of the conditional expression (6) is exceeded, the refractive power of the third lens unit L3 becomes too strong. Because the axial light flux entering the third lens unit L3 has a large height from the optical axis, spherical aberration and axial chromatic aberration are increased. As a result, it becomes difficult to correct these aberrations. In addition, when the number of lenses is increased to correct the spherical aberration and the axial chromatic aberration, the entire system becomes large. It is preferred to set the value range of the conditional expression (6) as follows.

$$0.81 < f3/f4 < 1.07 \tag{6a}$$

The conditional expression (7) defines a relationship of the back focus of the entire system. When the upper limit value of the conditional expression (7) is exceeded, the back focus becomes too long so that the entire system becomes large. In addition, when the lower limit value of the conditional expression (7) is exceeded, the back focus becomes too short. Then, it becomes difficult to dispose an optical member such as a quick return mirror when applying to a single lens reflex camera or the like. It is preferred to set the vales range of the conditional expression (7) as follows.

$$0.59 < SKw/fw < 0.82 \tag{7a}$$

As described above, according to each embodiment, it is possible to easily provide a zoom lens that includes the image stabilizing lens unit having a small size and light weight and has high optical performance with little aberration variations in the image stabilization. The image stabilizing lens unit includes one or more positive lenses and one or more negative lenses for suppressing generation of decentering chromatic aberration. In addition, in order to maintain good optical performance even when so-called decentering sensitivity is enhanced, three lenses are used including, in order from the object side to the image side, a negative lens, a positive lens, and a negative lens. Thus, a small size and light weight, and high performance are achieved.

When the second lens unit L2 is moved during zooming, it is necessary to use a mechanical member for moving outside the image stabilizing lens unit so that the outer diameter is increased. Therefore, the second lens unit L2 is not moved during zooming.

Next, lens structures of the zoom lenses of the embodiments are described. The zoom lens of Embodiment 1 includes, in order from the object side to the image side, the first lens unit L1 having a positive refractive power, the second lens unit L2 having a negative refractive power, the third lens unit L3 having a positive refractive power, the fourth lens unit L4 having a positive refractive power, the fifth lens unit L5 having a negative refractive power, and the sixth lens unit L6 having a positive refractive power. Embodiment 1 is a six-unit zoom lens.

The first lens unit L1 includes, in order from the object side to the image side, a positive lens having a convex surface on the object side (lens having a positive refractive power), and a cemented lens in which a negative meniscus lens having a convex surface on the object side (lens having a negative refractive power) and a positive lens having a convex surface on the object side are cemented. The second lens unit L2 includes, in order from the object side to the image side, a cemented lens in which a negative lens having a concave surface on the object side and a positive meniscus lens having a convex surface on the object side are cemented, and a negative lens having a concave surface on the object side.

The second lens unit L2 is an image stabilizing lens unit. The third lens unit L3 includes, in order from the object side to the image side, a positive lens having a convex surface on the object side, a cemented lens in which a positive lens having a convex surface on the object side and a negative lens having a concave surface on the object side are cemented, and an aperture stop S. The fourth lens unit L4 includes, in order from the object side to the image side, a negative lens having a concave surface on the object side, a positive lens having a convex surface on the object side, and a positive lens having a convex surface on the object side. The fifth lens unit L5 includes, in order from the object side to the image side, a positive meniscus lens having a concave surface on the object side, and a negative lens having a concave surface on the object side.

The fifth lens unit L5 moves toward the image side during focusing from an object at infinity to an object at short distance. The sixth lens unit L6 is constituted of a positive lens having a convex surface on the object side. In addition, during zooming from the wide angle end to the telephoto end, the first lens unit L1 moves toward the object side, the second lens unit L2 does not move, the third lens unit L3, the fourth lens unit L4, and the fifth lens unit L5 move toward the object side, and the sixth lens unit L6 does not move.

The zoom lens of Embodiment 2 has the same zoom type as that of Embodiment 1, such as the number of lens units and signs of refractive powers of the lens units, and movement conditions of the lens units during zooming. In addition, lens structures of the lens units are the same as those of Embodiment 1. The focusing type of the zoom lens of Embodiment 2 is the same as that of Embodiment 1.

In the zoom lens of Embodiment 3, the number of lens units and signs of refractive powers of the lens units are the same as those of Embodiment 1. The lens structures of the lens units are the same as those of Embodiment 1. The focusing type of the zoom lens of Embodiment 3 is the same as that of Embodiment 1. In Embodiment 3, during zooming from the wide angle end to the telephoto end, the first lens unit L1 moves toward the object side, the second lens unit L2 does not move, and third lens unit L3, the fourth lens unit L4, the fifth lens unit L5, and the sixth lens unit L6 move toward the object side.

The zoom lens of Embodiment 4 includes, in order from the object side to the image side, the first lens unit L1 having a positive refractive power, the second lens unit L2 having a negative refractive power, the third lens unit L3 having a positive refractive power, the fourth lens unit L4 having a positive refractive power, and the fifth lens unit L5 having a negative refractive power. Embodiment 4 is a five-unit zoom lens. The lens structures of the first lens unit L1 are the same as that of Embodiment 1.

The second lens unit 22 includes, in order from the object side to the image side, a cemented lens in which a negative meniscus lens having a convex surface on the object side and a positive meniscus lens having a convex surface on the object side are cemented, and a negative lens having a concave surface on the object side. The third lens unit L3 includes, in order from the object side to the image side, an aperture stop S, a positive lens having a convex surface on the object side, and a cemented lens in which a positive lens having a convex surface on the object side and a negative lens having a concave surface on the object side are cemented. The lens structures of the fourth lens unit L4 and the fifth lens unit L5 are the same as those of Embodiment 1. The focusing type of the zoom lens of Embodiment 4 is the same as that of Embodiment 1.

In Embodiment 4, during zooming from the wide angle end to the telephoto end, the first lens unit L1 moves toward the object side, the second lens unit L2 does not move, and third lens unit L3, the fourth lens unit L4, and the fifth lens unit L5 move toward the object side.

In the zoom lens of Embodiment 5, the number of lens units and signs of refractive powers of the lens units are the same as those of Embodiment 1. The lens structures of the lens units sets the same as those of Embodiment 1. The focusing type of the zoom lens of Embodiment 5 is the same as that of Embodiment 1. In Embodiment 5, during zooming from the wide angle end to the telephoto end, the first lens unit L1 moves toward the image side, the second lens unit L2 does not move, and third lens unit L3, the fourth lens unit L4, the fifth lens unit L5, and the sixth lens unit L6 move toward the object side.

In the zoom lens of Embodiment 6, the number of lens units and signs of refractive powers of the lens units are the same as those of Embodiment 1. The focusing type of the zoom lens of Embodiment 6 is the same as that of Embodiment 1. The first lens unit L1 includes, in order from the object side to the image side, a positive meniscus lens having a convex surface on the object side, and a cemented lens in which a negative meniscus lens having a convex surface on the object side and a positive lens having a convex surface on the object side are cemented.

The lens structures of the second lens unit L2 and the third lens unit L3 are the same as those of Embodiment 1. The fourth lens unit in includes, in order from the object side to the image side, a negative meniscus lens having a convex surface on the object side, a positive lens having a center surface on the object side, and a positive lens having a convex surface on the object side. The lens structure of the fifth lens unit L5 is the same as that of Embodiment 1.

The sixth lens unit L6 includes a positive meniscus lens having a concave surface on the object side. In Embodiment 6, curing zooming from the wide angle end to the telephoto end, the first lens unit L1 moves toward the image plane side, the second lens unit L2 does not move, and the third lens unit L3, the fourth lens unit L4, the fifth lens unit L5, and the sixth lens unit L6 move toward the object side.

In the zoom lens of Embodiment 7, the number of lens units and signs of refractive powers of the lens units are the same as those of Embodiment 1. The focusing type of the zoom lens of Embodiment 7 is the same as that of Embodiment 1. Embodiment 7 is different from Embodiment 1 in that the second lens unit L2 is constituted of the first sub-lens unit L21 (image stabilizing lens unit) that moves in the direction perpendicular to the optical axis for image stabilization, and a second sub-lens unit L22 that does not move for image stabilization. The lens structure of the first lens unit L1 is the same as that of Embodiment 1.

The first sub-lens unit L21 includes, in order from the object side to the image side, a cemented lens in which a negative lens having a concave surface on the object side and a positive meniscus lens having a convex surface on the object side are cemented, and a negative lens having a concave surface on the object side. The second sub-lens unit L22 includes a positive lens. The lens structures of the third lens unit L3, the fourth lens unit L4, the fifth lens unit L5, and the sixth lens unit L6 are the same as those of Embodiment 1.

In Embodiment 7, during zooming from the wide angle end to the telephoto end, the first lens unit L1 moves toward the object side, the second lens unit L2 does not move, and the third lens unit L3, the fourth lens unit L4, the fifth lens unit L5, and the sixth lens unit L6 move toward the object side.

The embodiments of the present invention are described above, but the present invention is not limited to those embodiments, and various modifications and changes can be performed.

Next, an embodiment in which the zoom lens described in Embodiments 1 to 7 is applied to an image pickup apparatus is described with reference to FIG. 17. The image pickup apparatus of the present invention includes an interchangeable lens apparatus including the zoom lens, and a camera main body that is connected so the interchangeable lens apparatus via a camera mount portion in an attachable and detachable manner and includes an image pickup element that receives an optical image formed by the zoom lens and converts the optical image into an electric image signal.

FIG. 17 is a schematic diagram of a main part of a single-lens reflex camera. In FIG. 17, an imaging lens 10 includes a zoom lens 1 of Embodiments 1 to 7. The zoom lens 1 is held by a lens barrel 2 as a holding member. A camera main body 20 includes a quick return mirror 3 for reflecting a light beam from the imaging lens 10 to the upward direction, and a reticle plate 4 disposed in an image forming position for the imaging lens 10. The camera main body 20 further includes a penta roof prism 5 for converting an inverse image formed on the reticle plate 4 into an erect image, and an eyepiece lens 6 for observing the erect image.

As a photosensitive plane 7, there is disposed a solid-state image pickup element (photoelectric transducer) such as a CCD sensor or a CMOS sensor for receiving the image formed by the zoom lens, or a silver-halide film. When taking an image, the quick return mirror 3 is retracted from the optical path, and an image is formed on the photosensitive plane 7 by the imaging lens 10. The zoom lens or each of the embodiments can be also applied to a mirror less camera without the quick return mirror 3.

Now, Numerical Embodiments 1 to 7 corresponding to Embodiments 1 to 7 of the present invention are described. In each numerical embodiment, i represents an order of a surface from the object side. In each numerical embodiment, ri represents a curvature radius of an i-th lens surface in order from the object side, di represents a lens thickness and an air distance between the i-th lens surface and an (i+1)-th lens surface in order from the object side, and ndi and vdi are respectively a refractive index and Abbe constant of a lens material of the i-th surface in order from the object side. BF represents back focus.

In Numerical Embodiment 6, an interval d16 is negative at the intermediate zoom position because the aperture stop and the fourth lens unit L4 are mentioned in this order. Further, calculation results of conditional expressions based on lens data of Numerical Embodiments 1 to 7 described below are shown in Table 2.

(Numerical Embodiment 1)

Unit mm
Surface data

| Surface number | r | d | nd | vd | Effective diameter |
|---|---|---|---|---|---|
| 1 | 75.822 | 4.04 | 1.48749 | 70.2 | 41.07 |
| 2 | −1012.039 | 0.15 | | | 40.88 |
| 3 | 103.585 | 1.50 | 1.65412 | 39.7 | 40.20 |
| 4 | 40.402 | 6.21 | 1.48749 | 70.2 | 38.71 |
| 5 | 309.896 | (Variable) | | | 38.24 |
| 6 | −175.936 | 1.00 | 1.72916 | 54.7 | 20.06 |
| 7 | 21.469 | 3.11 | 1.84666 | 23.8 | 19.57 |
| 8 | 56.355 | 1.83 | | | 19.28 |
| 9 | −46.811 | 1.00 | 1.80400 | 46.6 | 19.28 |
| 10 | 301.065 | (Variable) | | | 19.61 |
| 11 | 60.758 | 3.11 | 1.61800 | 63.3 | 21.08 |
| 12 | −57.019 | 7.14 | | | 21.17 |
| 13 | 32.897 | 4.46 | 1.51633 | 64.1 | 20.09 |
| 14 | −37.170 | 1.00 | 1.90366 | 31.3 | 19.63 |
| 15 | 151.138 | 2.00 | | | 19.34 |
| 16 (Stop) | ∞ | (Variable) | | | 19.17 |
| 17 | −2306.862 | 1.00 | 1.74950 | 35.3 | 17.77 |
| 18 | 37.719 | 0.83 | | | 17.67 |
| 19 | 82.429 | 2.64 | 1.60311 | 60.6 | 17.74 |
| 20 | −39.842 | 0.10 | | | 17.84 |
| 21 | 25.327 | 2.34 | 1.54072 | 47.2 | 17.47 |
| 22 | 87.278 | (Variable) | | | 17.06 |
| 23 | −48.163 | 1.33 | 1.80518 | 25.4 | 15.36 |
| 24 | −31.164 | 4.85 | | | 15.28 |
| 25 | −26.533 | 0.70 | 1.51823 | 58.9 | 14.13 |
| 26 | 40.439 | (Variable) | | | 14.39 |
| 27 | 44.282 | 1.55 | 1.68893 | 31.1 | 21.45 |
| 28 | 59.437 | 37.49 | | | 21.38 |
| Image plane | ∞ | | | | |

Various data

| | Zoom ratio | 4.27 | |
|---|---|---|---|
| | Wide angle | Intermediate | Telephoto |
| Focal length | 56.58 | 134.04 | 241.47 |
| F-number | 4.15 | 5.15 | 5.88 |
| Half angle of field (degree) | 13.57 | 5.82 | 3.24 |
| Image height | 13.66 | 13.66 | 13.66 |
| Total lens length | 154.69 | 186.00 | 205.69 |
| BF | 37.49 | 37.49 | 37.49 |
| d 5 | 7.00 | 38.31 | 58.00 |
| d10 | 29.92 | 12.19 | 1.00 |
| d16 | 21.90 | 14.16 | 17.23 |
| d22 | 2.00 | 5.04 | 4.00 |
| d26 | 4.47 | 260.90 | 36.06 |

-continued (Numerical Embodiment 1)

Zoom lens unit data

| Unit | Leading surface | Focal length | Lens structure length | Front principal point position | Rear principal point position |
|---|---|---|---|---|---|
| 1 | 1 | 130.95 | 11.90 | −1.12 | −8.95 |
| 2 | 6 | −29.35 | 6.94 | 3.36 | −1.25 |
| 3 | 11 | 45.59 | 17.73 | −1.33 | −14.85 |
| 4 | 17 | 52.88 | 6.90 | 4.48 | −0.02 |
| 5 | 23 | −45.71 | 6.88 | 7.54 | 1.33 |
| 6 | 27 | 241.99 | 1.55 | −2.57 | −3.45 |

(Numerical Embodiment 2)

Unit mm
Surface data

| Surface number | r | d | nd | vd | Effective diameter |
|---|---|---|---|---|---|
| 1 | 82.406 | 3.78 | 1.48749 | 70.2 | 41.07 |
| 2 | −1441.511 | 0.15 | | | 40.90 |
| 3 | 102.85 | 1.50 | 1.65412 | 39.7 | 40.23 |
| 4 | 43.321 | 5.16 | 1.49700 | 81.5 | 38.99 |
| 5 | 434.728 | (Variable) | | | 38.73 |
| 6 | −390.425 | 1.00 | 1.72916 | 54.7 | 19.93 |
| 7 | 20.102 | 3.19 | 1.84666 | 23.8 | 19.31 |
| 8 | 48.621 | 1.97 | | | 18.93 |
| 9 | −44.138 | 1.00 | 1.80400 | 46.6 | 18.93 |
| 10 | 243.626 | (Variable) | | | 19.26 |
| 11 | 59.668 | 3.09 | 1.72916 | 54.7 | 20.95 |
| 12 | −57.807 | 5.02 | | | 20.98 |
| 13 | 31.185 | 3.91 | 1.48749 | 70.2 | 19.21 |
| 14 | −37.629 | 1.00 | 1.90366 | 31.3 | 18.78 |
| 15 | 107.506 | 5.12 | | | 18.42 |
| 16 (Stop) | ∞ | (Variable) | | | 17.90 |
| 17 | −402.067 | 1.00 | 1.74950 | 35.3 | 16.70 |
| 18 | 38.772 | 0.67 | | | 16.61 |
| 19 | 87.555 | 3.70 | 1.60311 | 60.6 | 16.65 |
| 20 | −36.374 | 1.47 | | | 16.85 |
| 21 | 25.406 | 2.22 | 1.54072 | 47.2 | 16.27 |
| 22 | 89.105 | (Variable) | | | 16.86 |
| 23 | −42.175 | 1.30 | 1.80518 | 25.4 | 14.23 |
| 24 | −29.178 | 4.27 | | | 14.45 |
| 25 | −26.375 | 0.70 | 1.51823 | 58.9 | 14.05 |
| 26 | 40.439 | (Variable) | | | 14.34 |
| 27 | 80.255 | 1.66 | 1.68893 | 31.1 | 21.81 |
| 28 | 210.811 | 37.00 | | | 21.86 |
| Image plane | ∞ | | | | |

Various data

Zoom ratio 4.27

| | Wide angle | Intermediate | Telephoto |
|---|---|---|---|
| Focal length | 56.53 | 133.00 | 241.99 |
| F-number | 4.16 | 5.15 | 5.88 |
| Half angle of field (degree) | 13.58 | 6.86 | 3.24 |
| Image height | 13.66 | 13.66 | 13.66 |
| Total lens length | 150.33 | 182.33 | 200.33 |
| BF | 37.00 | 37.00 | 37.00 |
| d 5 | 7.00 | 39.00 | 57.00 |
| d10 | 28.48 | 12.29 | 1.00 |
| d16 | 18.20 | 10.96 | 12.42 |
| d22 | 2.00 | 4.77 | 3.67 |
| d26 | 4.77 | 25.43 | 36.36 |

(Numerical Embodiment 2)

Zoom lens unit data

| Unit | Leading surface | Focal length | Lens structure length | Front principal point position | Rear principal point position |
|---|---|---|---|---|---|
| 1 | 1 | 125.15 | 10.59 | −0.34 | −7.34 |
| 2 | 6 | −28.29 | 7.15 | 3.73 | −1.08 |
| 3 | 11 | 42.82 | 18.15 | −2.23 | −16.27 |
| 4 | 17 | 51.94 | 9.06 | 6.46 | 0.35 |
| 5 | 23 | −43.75 | 6.27 | 6.37 | 0.85 |
| 6 | 27 | 187.13 | 1.66 | −0.60 | −1.58 |

(Numerical Embodiment 3)
Unit mm
Surface data

| Surface number | r | d | nd | vd | Effective diameter |
|---|---|---|---|---|---|
| 1 | 70.708 | 4.54 | 1.48749 | 70.2 | 41.04 |
| 2 | ∞ | 0.15 | | | 40.75 |
| 3 | 96.801 | 1.70 | 1.65412 | 39.7 | 40.08 |
| 4 | 38.081 | 6.35 | 1.48749 | 70.2 | 38.43 |
| 5 | 328.523 | (Variable) | | | 37.99 |
| 6 | −184.566 | 0.80 | 1.71300 | 53.9 | 18.20 |
| 7 | 19.233 | 2.61 | 1.80809 | 22.8 | 17.72 |
| 8 | 43.170 | 2.06 | | | 17.46 |
| 9 | −40.963 | 0.80 | 1.80400 | 46.6 | 17.46 |
| 10 | 66857.597 | (Variable) | | | 17.78 |
| 11 | 156.448 | 2.88 | 1.80400 | 46.6 | 20.73 |
| 12 | −53.274 | 2.84 | | | 20.91 |
| 13 | 30.717 | 5.21 | 1.49700 | 81.5 | 20.38 |
| 14 | −48.144 | 1.12 | 1.90366 | 31.3 | 19.66 |
| 15 | 127.403 | 2.65 | | | 19.32 |
| 16 (Stop) | ∞ | (Variable) | | | 19.04 |
| 17 | −85.617 | 1.00 | 1.80610 | 33.3 | 17.11 |
| 18 | 39.709 | 0.36 | | | 17.22 |
| 19 | 57.007 | 3.21 | 1.72916 | 54.7 | 17.25 |
| 20 | −41.442 | 0.10 | | | 17.46 |
| 21 | 28.396 | 3.21 | 1.65844 | 50.9 | 17.24 |
| 22 | 267.012 | (Variable) | | | 16.62 |
| 23 | −115.808 | 1.56 | 1.76182 | 26.5 | 15.22 |
| 24 | −39.330 | 2.16 | | | 15.20 |
| 25 | −39.123 | 0.70 | 1.69680 | 55.5 | 14.42 |
| 26 | 28.866 | (Variable) | | | 14.32 |
| 27 | 46.017 | 2.60 | 1.54072 | 47.2 | 18.32 |
| 28 | 131.738 | (Variable) | | | 18.40 |
| Image Plane | ∞ | | | | |

Various data

Zoom ratio 4.25

| | | | | | | |
|---|---|---|---|---|---|---|
| Focal length | 56.80 | 135.16 | 241.32 | 74.27 | 203.01 | 57.92 |
| F-number | 4.16 | 5.18 | 5.88 | 4.44 | 5.58 | 4.18 |
| Half angle of field (degree) | 13.52 | 5.77 | 3.24 | 10.42 | 3.85 | 0.00 |
| Image height | 13.66 | 13.66 | 13.66 | 13.66 | 13.66 | 0.00 |
| Total less length | 153.89 | 191.28 | 208.89 | 167.12 | 204.31 | 154.99 |
| BF | 38.57 | 57.35 | 65.38 | 45.28 | 63.56 | 39.06 |
| d 5 | 5.87 | 43.27 | 60.87 | 19.11 | 56.30 | 6.97 |
| d10 | 24.92 | 11.82 | 1.50 | 20.90 | 4.95 | 24.67 |
| d16 | 19.96 | 13.68 | 16.56 | 17.26 | 14.94 | 19.72 |
| d22 | 4.10 | 3.40 | 2.05 | 3.85 | 2.60 | 4.06 |
| d26 | 11.86 | 12.56 | 13.91 | 12.11 | 13.36 | 11.90 |
| d28 | 38.57 | 57.95 | 65.38 | 45.28 | 63.56 | 39.06 |

-continued

Zoom lens unit data

| Unit | Leading surface | Focal length | Lens structure length | Front principal point position | Rear principal point position |
|---|---|---|---|---|---|
| 1 | 1 | 126.40 | 12.74 | −1.18 | −9.55 |
| 2 | 6 | −26.32 | 6.27 | 2.97 | −1.41 |
| 3 | 11 | 44.00 | 14.70 | −1.15 | −11.65 |
| 4 | 17 | 42.70 | 7.88 | 4.46 | −0.13 |
| 5 | 23 | −35.50 | 4.42 | 4.23 | 0.72 |
| 6 | 27 | 129.41 | 2.60 | −0.90 | −2.57 |

(Numerical Embodiment 4)

Unit mm
Surface data

| Surface number | r | d | nd | vd | Effective diameter |
|---|---|---|---|---|---|
| 1 | 145.876 | 3.06 | 1.48749 | 70.2 | 41.16 |
| 2 | 526.699 | 0.15 | | | 40.97 |
| 3 | 91.482 | 1.50 | 1.59271 | 35.3 | 40.76 |
| 4 | 46.566 | 6.92 | 1.49700 | 81.5 | 39.91 |
| 5 | −457.579 | (Variable) | | | 39.53 |
| 6 | 1220.841 | 1.00 | 1.71659 | 55.5 | 20.35 |
| 7 | 19.681 | 2.43 | 1.80809 | 22.8 | 19.64 |
| 8 | 39.993 | 2.51 | | | 19.40 |
| 9 | −36.479 | 1.20 | 1.78879 | 47.6 | 19.40 |
| 10 | −257.070 | (Variable) | | | 19.91 |
| 11 (Stop) | ∞ | 1.26 | | | 20.66 |
| 12 | 99.885 | 2.41 | 1.73600 | 48.7 | 21.19 |
| 13 | −67.545 | 5.00 | | | 21.26 |
| 14 | 34.882 | 5.68 | 1.49700 | 81.5 | 20.58 |
| 15 | −44.225 | 1.00 | 1.90366 | 31.3 | 19.86 |
| 16 | 179.893 | (Variable) | | | 19.65 |
| 17 | 309.116 | 1.50 | 1.84586 | 24.5 | 18.34 |
| 18 | 39.894 | 1.15 | | | 18.18 |
| 19 | 105.376 | 4.55 | 1.51726 | 52.5 | 18.32 |
| 20 | −40.778 | 0.50 | | | 19.23 |
| 21 | 28.874 | 3.82 | 1.57108 | 39.0 | 20.22 |
| 22 | 4114.716 | (Variable) | | | 20.03 |
| 23 | −140.662 | 1.81 | 1.66336 | 31.1 | 19.48 |
| 24 | −41.765 | 4.55 | | | 19.45 |
| 25 | −33.416 | 0.70 | 1.62449 | 62.8 | 17.69 |
| 26 | 44.523 | (Variable) | | | 17.64 |
| Image plane | ∞ | | | | |

Various data

Zoom ratio 4.40

| | Wide angle | Intermediate | Telephoto |
|---|---|---|---|
| Focal length | 55.00 | 137.00 | 242.00 |
| F-number | 4.16 | 5.75 | 5.88 |
| Half angle of field (degree) | 13.95 | 6.69 | 3.23 |
| Image height | 13.66 | 13.66 | 13.66 |
| Total lens length | 160.37 | 187.35 | 211.37 |
| BF | 43.47 | 67.04 | 78.61 |
| d 5 | 7.00 | 33.98 | 58.00 |
| d10 | 30.11 | 8.11 | 1.00 |
| d16 | 23.11 | 17.74 | 19.07 |
| d22 | 4.00 | 7.80 | 2.00 |
| d26 | 43.47 | 67.04 | 78.61 |

-continued (Numerical Embodiment 4)
Zoom lens unit data

| Unit | Leading surface | Focal length | Lens structure length | Front principal point position | Rear principal point position |
|---|---|---|---|---|---|
| 1 | 1 | 127.13 | 11.63 | 1.82 | −5.99 |
| 2 | 6 | −29.54 | 7.14 | 3.48 | −1.61 |
| 3 | 11 | 50.22 | 15.35 | −0.53 | −11.60 |
| 4 | 17 | 48.01 | 11.52 | 7.84 | 0.40 |
| 5 | 23 | −50.00 | 7.06 | 8.56 | 2.16 |

(Numerical Embodiment 5)

Unit mm
Surface data

| Surface number | r | d | nd | vd | Effective diameter |
|---|---|---|---|---|---|
| 1 | 73.495 | 5.94 | 1.48749 | 70.2 | 49.83 |
| 2 | −3646.672 | 0.15 | | | 49.48 |
| 3 | 81.269 | 1.70 | 1.65412 | 39.7 | 48.10 |
| 4 | 37.234 | 8.21 | 1.49700 | 81.5 | 45.44 |
| 5 | 206.458 | (Variable) | | | 44.84 |
| 6 | 1871.752 | 0.90 | 1.71300 | 53.9 | 19.26 |
| 7 | 16.040 | 2.96 | 1.80809 | 22.8 | 18.32 |
| 8 | 32.461 | 2.63 | | | 17.91 |
| 9 | −32.185 | 0.80 | 1.80400 | 46.6 | 17.90 |
| 10 | ∞ | (Variable) | | | 18.32 |
| 11 | 87.667 | 3.22 | 1.80400 | 46.6 | 21.20 |
| 12 | −53.220 | 1.64 | | | 21.34 |
| 13 | 31.034 | 4.92 | 1.49700 | 81.5 | 20.65 |
| 14 | −40.467 | 1.10 | 1.90366 | 31.3 | 20.01 |
| 15 | 108.202 | 7.87 | | | 19.60 |
| 16 (Stop) | ∞ | (Variable) | | | 18.76 |
| 17 | −164.687 | 1.00 | 1.80610 | 33.3 | 17.43 |
| 18 | 34.844 | 0.37 | | | 17.39 |
| 19 | 51.626 | 3.06 | 1.72916 | 54.7 | 17.39 |
| 20 | −53.765 | 0.51 | | | 17.52 |
| 21 | 29.324 | 2.92 | 1.65844 | 50.9 | 17.27 |
| 22 | −306.488 | (Variable) | | | 16.86 |
| 23 | −129.795 | 1.57 | 1.76182 | 26.5 | 15.36 |
| 24 | −38.535 | 2.00 | | | 15.13 |
| 25 | −37.729 | 0.70 | 1.69680 | 55.5 | 13.49 |
| 26 | 26.300 | (Variable) | | | 12.93 |
| 27 | 39.189 | 1.92 | 1.5072 | 47.2 | 16.94 |
| 28 | 70.832 | (Variable) | | | 16.94 |
| Image plane | ∞ | | | | |

Various data

Zoom ratio 5.20

| | Wide angle | Intermediate | Telephoto |
|---|---|---|---|
| Focal length | 56.37 | 133.75 | 293.01 |
| F-number | 4.16 | 5.18 | 5.88 |
| Half angle of field (degree) | 13.62 | 5.83 | 2.67 |
| Image height | 13.66 | 13.66 | 13.66 |
| Total lens length | 155.00 | 190.52 | 210.00 |
| BF | 38.40 | 54.49 | 65.40 |
| d 5 | 6.03 | 41.54 | 61.03 |
| d10 | 24.64 | 14.10 | 1.50 |
| d16 | 11.96 | 6.41 | 8.10 |
| d22 | 4.10 | 3.73 | 2.00 |
| d26 | 13.78 | 14.13 | 15.88 |
| d28 | 38.40 | 54.49 | 65.40 |

(Numerical Embodiment 5)

Zoom lens unit data

| Unit | Leading surface | Focal length | Lens structure length | Front principal point position | Rear principal point position |
|---|---|---|---|---|---|
| 1 | 1 | 119.27 | 16.00 | −1.58 | −11.97 |
| 2 | 6 | −22.60 | 7.29 | 3.92 | −1.29 |
| 3 | 11 | 41.16 | 18.76 | −1.71 | −16.20 |
| 4 | 17 | 38.89 | 7.85 | 4.61 | −0.17 |
| 5 | 23 | −33.36 | 4.27 | 4.07 | 0.70 |
| 6 | 27 | 158.85 | 1.92 | −1.51 | −2.73 |

(Numerical Embodiment 6)

Unit mm
Surface data

| Surface number | r | d | nd | vd | Effective diameter |
|---|---|---|---|---|---|
| 1 | 54.372 | 4.94 | 1.87394 | 33.2 | 50.19 |
| 2 | 116.578 | 0.15 | | | 49.39 |
| 3 | 81.662 | 1.70 | 1.86471 | 31.2 | 48.61 |
| 4 | 35.777 | 8.02 | 1.49700 | 81.5 | 44.86 |
| 5 | 151.352 | (Variable) | | | 44.16 |
| 6 | −62.903 | 0.90 | 1.84659 | 38.2 | 18.34 |
| 7 | 22.190 | 2.88 | 1.92286 | 18.9 | 18.20 |
| 8 | 96.712 | 1.86 | | | 18.10 |
| 9 | −33.489 | 0.80 | 1.83258 | 42.2 | 18.10 |
| 10 | ∞ | (Variable) | | | 18.66 |
| 11 | 333.030 | 3.85 | 1.80400 | 46.6 | 24.10 |
| 12 | −34.574 | −0.02 | | | 24.50 |
| 13 | 46.736 | 5.65 | 1.49700 | 81.5 | 24.18 |
| 14 | −33.218 | 1.10 | 1.90366 | 31.3 | 23.75 |
| 15 | −358.332 | 2.11 | | | 23.71 |
| 16 (Stop) | ∞ | (Variable) | | | 23.52 |
| 17 | 101.897 | 2.00 | 1.80610 | 33.3 | 21.90 |
| 18 | 32.992 | 0.74 | | | 21.44 |
| 19 | 56.958 | 3.28 | 1.72916 | 54.7 | 21.43 |
| 20 | −90.295 | 0.10 | | | 21.44 |
| 21 | 23.551 | 4.55 | 1.48429 | 78.7 | 20.93 |
| 22 | −754.746 | (Variable) | | | 20.08 |
| 23 | −160.298 | 1.67 | 1.50885 | 53.0 | 17.46 |
| 24 | −43.608 | 3.51 | | | 17.06 |
| 25 | −46.619 | 0.70 | 1.73567 | 57.4 | 16.18 |
| 26 | 23.843 | (Variable) | | | 16.27 |
| 27 | −36.498 | 2.86 | 1.76161 | 27.2 | 26.42 |
| 28 | −26.197 | (Variable) | | | 27.45 |
| Image plane | ∞ | | | | |

Various data

Zoom ratio 4.03

| | Wide angle | Intermediate | Telephoto |
|---|---|---|---|
| Focal length | 71.98 | 132.96 | 289.94 |
| F-number | 4.16 | 5.81 | 5.88 |
| Half angle of field (degree) | 10.75 | 5.87 | 2.70 |
| Image height | 13.66 | 13.66 | 13.66 |
| Total lens length | 153.77 | 190.61 | 231.68 |
| BF | 42.84 | 73.31 | 65.38 |
| d 5 | 2.29 | 39.13 | 80.19 |
| d10 | 13.24 | 9.03 | 1.45 |
| d16 | 18.44 | −7.81 | 7.70 |
| d22 | 4.15 | 2.62 | 3.11 |
| d26 | 19.44 | 20.98 | 20.49 |
| d28 | 42.84 | 73.31 | 65.38 |

(Numerical Embodiment 6)

Zoom lens unit data

| Unit | Leading surface | Focal length | Lens structure length | Front principal point position | Rear principal point position |
|---|---|---|---|---|---|
| 1 | 1 | 154.99 | 14.81 | −9.05 | −17.25 |
| 2 | 6 | −21.71 | 6.44 | 2.47 | −1.70 |
| 3 | 11 | 36.04 | 12.69 | 0.68 | −7.72 |
| 4 | 17 | 38.40 | 10.68 | 4.27 | −2.64 |
| 5 | 23 | −27.06 | 5.88 | 8.78 | 0.64 |
| 6 | 27 | 108.79 | 2.86 | 5.14 | 3.69 |

(Numerical Embodiment 7)

Unit mm
Surface data

| Surface number | r | d | nd | vd | Effective diameter |
|---|---|---|---|---|---|
| 1 | 68.733 | 5.45 | 1.48749 | 70.2 | 43.04 |
| 2 | 37291.342 | 0.15 | | | 42.46 |
| 3 | 87.968 | 1.70 | 1.65412 | 39.7 | 41.33 |
| 4 | 36.968 | 6.67 | 1.48749 | 70.2 | 39.14 |
| 5 | 197.368 | (Variable) | | | 38.40 |
| 6 | −1985.689 | 0.80 | 1.77250 | 49.6 | 18.60 |
| 7 | 18.807 | 2.55 | 1.80809 | 22.8 | 17.23 |
| 8 | 39.088 | 2.19 | | | 16.96 |
| 9 | −32.201 | 0.80 | 1.88300 | 40.8 | 16.96 |
| 10 | −331.821 | 1.0 | | | 17.43 |
| 11 | −358.698 | 1.83 | 1.84666 | 23.8 | 17.88 |
| 12 | −94.011 | (Variable) | | | 18.27 |
| 13 | 242.735 | 2.83 | 1.80400 | 46.6 | 21.15 |
| 14 | −52.182 | 1.11 | | | 21.36 |
| 15 | 30.515 | 5.41 | 1.49700 | 81.5 | 21.00 |
| 16 | −49.507 | 1.12 | 1.90366 | 31.3 | 20.26 |
| 17 | 147.511 | 4.79 | | | 19.91 |
| 18 (Stop) | ∞ | (Variable) | | | 19.28 |
| 19 | −175.459 | 1.00 | 1.80610 | 33.3 | 17.14 |
| 20 | 31.900 | 0.46 | | | 17.10 |
| 21 | 37.532 | 3.27 | 1.72916 | 54.7 | 17.23 |
| 22 | −56.172 | 0.10 | | | 17.30 |
| 23 | 31.821 | 2.53 | 1.65844 | 50.9 | 17.00 |
| 24 | 278.912 | (Variable) | | | 16.53 |
| 25 | −161.410 | 1.56 | 1.76182 | 26.5 | 15.25 |
| 26 | −41.180 | 2.19 | | | 15.02 |
| 27 | −39.437 | 0.70 | 1.69680 | 55.5 | 13.78 |
| 28 | 27.576 | (Variable) | | | 13.67 |
| 29 | 41.829 | 1.96 | 1.54072 | 47.2 | 17.43 |
| 30 | 83.898 | (Variable) | | | 17.47 |
| Image plane | ∞ | | | | |

Various data

Zoom ratio 4.25

| | Wide angle | Intermediate | Telephoto |
|---|---|---|---|
| Focal length | 56.80 | 133.00 | 241.19 |
| F-number | 4.16 | 5.18 | 5.88 |
| Half angle of field (degree) | 13.52 | 5.86 | 3.24 |
| Image height | 13.66 | 13.66 | 13.66 |
| Total lens length | 155.00 | 193.00 | 210.00 |
| BF | 39.60 | 57.07 | 63.95 |
| d 5 | 7.00 | 45.00 | 62.00 |
| d12 | 25.50 | 13.04 | 1.50 |
| d18 | 15.17 | 10.24 | 14.90 |
| d24 | 4.10 | 2.95 | 2.00 |
| d28 | 11.35 | 12.50 | 13.45 |
| d30 | 39.68 | 57.07 | 63.95 |

-continued (Numerical Embodiment 7)

Zoom lens unit data

| Unit | Leading surface | Focal length | Lens structure length | Front principal point position | Rear principal point position |
|---|---|---|---|---|---|
| 1 | 1 | 129.21 | 13.97 | −2.10 | −11.19 |
| 2 | 6 | −22.31 | 6.33 | 3.09 | −1.34 |
| 3 | 11 | 150.00 | 1.83 | 1.34 | 0.35 |
| 4 | 13 | 44.59 | 15.27 | −1.00 | −12.23 |
| 5 | 19 | 44.78 | 7.37 | 4.27 | −0.10 |
| 6 | 25 | −35.73 | 4.45 | 4.47 | 0.89 |
| 7 | 29 | 151.79 | 1.96 | −1.25 | −2.50 |

TABLE 2

| Em-bodiment | Conditional expression | | | | | | | |
|---|---|---|---|---|---|---|---|---|
| | (1) | (2) | (3) | (4) | θgF in (5) | (5) | (6) | (7) |
| 1 | 0.30 | 2.31 | 0.52 | 23.8 | 0.6205 | 0.0167 | 0.86 | 0.66 |
| 2 | 0.88 | 2.21 | 0.50 | 23.8 | 0.6205 | 0.0167 | 0.82 | 0.65 |
| 3 | 0.97 | 2.23 | 0.46 | 22.8 | 0.6307 | 0.025 | 1.03 | 0.68 |
| 4 | 0.93 | 2.31 | 0.54 | 22.8 | 0.6307 | 0.025 | 1.05 | 0.79 |
| 5 | 0.98 | 2.12 | 0.40 | 22.8 | 0.6307 | 0.025 | 1.06 | 0.68 |
| 6 | 1.08 | 2.15 | 0.30 | 18.9 | 0.6495 | 0.0375 | 0.94 | 0.60 |
| 7 | 0.97 | 2.27 | 0.39 | 22.8 | 0.6307 | 0.025 | 1.00 | 0.70 |

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2013-015283, filed Jan. 30, 2013, which is hereby incorporated by reference herein in its entirety.

What is claimed is:

1. A zoom lens comprising, in order from an object side to an image side:
    a first lens unit having a positive refractive power;
    a second lens unit having a negative refractive power;
    a third lens unit having a positive refractive power; and
    a fourth lens unit having a positive refractive power,
    wherein the first lens unit, the second lens unit, the third lens unit, and the fourth lens unit are configured so that an interval between the first lens unit and the second lens unit is increased, an interval between the second lens unit and the third lens unit is decreased, and an interval between the third lens unit and the fourth lens unit is changed during zooming from a wide angle end to a telephoto end of the zoom lens,
    wherein the second lens unit comprises an image stabilizing unit which is configured to move with a component of motion in a direction perpendicular to an optical axis whereby an imaging position is moved in the direction of motion perpendicular to the optical axis,
    wherein the image stabilizing unit comprises in order from the object side to the image side a negative lens, a positive lens and a negative lens, and
    wherein the following conditional expressions are satisfied:

$0.85 < |\Delta L1|/fw < 1.10$, $2.10 < f1/fw < 2.80$, $0.28 < |fvi/fw| < 0.60$, $0.58 < SKw/fw < 0.90$, $vd < 24$, and $0.015 < \theta gF - 0.6438 + 0.001682 \times vd < 0.100$, where fw represents a focal length of the zoom lens at the wide angle end, f1 represents a focal length of the first lens unit, ΔL1 represents a movement amount of the first lens unit with respect to an image plane during zooming from the wide angle end to the telephoto end, fvi represents a focal length of the image stabilizing unit, SKw represents a back focus at the wide angle end, and vd and θgF respectively represent an Abbe constant and a partial dispersion ratio of a material of the positive lens included in the image stabilizing unit.

2. The zoom lens according to claim 1, wherein the second lens unit is configured to not move during zooming of the zoom lens.

3. A zoom lens according to claim 1, comprising in order from the object side to the image side:
    the first lens unit having a positive refractive power;
    the second lens unit having a negative refractive power;
    the third lens unit having a positive refractive power;
    the fourth lens unit having a positive refractive power; and
    a fifth lens unit having a negative refractive power,
    wherein the second lens unit is configured so that it does not move during zooming, and the first lens unit, the third lens unit, the fourth lens unit, and the fifth lens unit are configured so that they move during zooming of the zoom lens.

4. A zoom lens according to claim 3, wherein the following conditional expression is satisfied:

$0.80 < f3/f4 < 1.1$, where f3 represents a focal length of the third lens unit, and f4 represents a focal length of the fourth lens unit.

5. A zoom lens according to claim 3, wherein the fifth lens unit is configured to move toward the image side during focusing from an object at infinity to an object at short distance.

6. A zoom lens according to claim 1, comprising in order from the object side to the image side:
    the first lens unit having a positive refractive power;
    the second lens unit having a negative refractive power;
    the third lens unit having a positive refractive power;
    the fourth lens unit having a positive refractive power;
    a fifth lens unit having a negative refractive power; and
    a sixth lens unit having a positive refractive power,
    wherein the second lens unit and the sixth lens unit are configured to not move during zooming of the zoom lens, and the first lens unit, the third lens unit, the fourth lens unit, and the fifth lens unit are configured to move during zooming of the zoom lens.

7. A zoom lens according to claim 6, wherein the following conditional expression is satisfied:

$0.80 < f3/f4 < 1.1$, where f3 represents a focal length of the third lens unit, and f4 represents a focal length of the fourth lens unit.

8. A zoom lens according to claim 6, wherein the fifth lens unit is configured to move toward the image side during focusing from an object at infinity to an object at short distance.

9. A zoom lens according to claim 1, comprising in order from the object side to the image side:
the first lens unit having a positive refractive power;
the second lens unit having a negative refractive power;
the third lens unit having a positive refractive power;
the fourth lens unit having a positive refractive power;
a fifth lens unit having a negative refractive power; and
a sixth lens unit having a positive refractive power,
wherein the second lens unit is configured to not move during zooming, and the first lens unit, the third lens unit, the fourth lens unit, the fifth lens unit, and the sixth lens unit are configured to move during zooming of the zoom lens.

10. A zoom lens according to claim 9, wherein the following conditional expression is satisfied:

$$0.80 < f3/f4 < 1.1,$$

where f3 represents a focal length of the third lens unit, and f4 represents a focal length of the fourth lens unit.

11. A zoom lens according to claim 9, wherein the fifth lens unit is configured to move toward the image side during focusing from an object at infinity to an object at short distance.

12. An image pickup apparatus comprising:
a zoom lens comprising, in order from an object side to an image side:
  a first lens unit having a positive refractive power;
  a second lens unit having a negative refractive power;
  a third lens unit having a positive refractive power; and
  a fourth lens unit having a positive refractive power,
  wherein the first lens unit, the second lens unit, the third lens unit, and the fourth lens unit are configured so that an interval between the first lens unit and the second lens unit is increased, an interval between the second lens unit and the third lens unit is decreased, and an interval between the third lens unit and the fourth lens unit is changed during zooming from a wide angle end to a telephoto end of the zoom lens,
  wherein the second lens unit comprises an image stabilizing unit which is configured to move with a component of motion in a direction perpendicular to an optical axis whereby an imaging position is moved in the direction perpendicular to the optical axis,
  wherein the image stabilizing unit comprises in order from the object side to the image side a negative lens, a positive lens and a negative lens, and
  wherein the following conditional expressions are satisfied:

$$0.85 < |\Delta L1|/fw < 1.10,$$

$$2.10 < f1/fw < 2.80,$$

$$0.28 < |fvi/fw| < 0.60,$$

$$0.58 < SKw/fw < 0.90,$$

$$vd < 24, \text{ and}$$

$$0.015 < \theta gF - 0.6438 + 0.001682 \times vd < 0.100,$$

where fw represents a focal length of the zoom lens at the wide angle end, f1 represents a focal length of the first lens unit, $\Delta L1$ represents a movement amount of the first lens unit with respect to an image plane during zooming from the wide angle end to the telephoto end, fvi represents a focal length of the image stabilizing unit, SKw represents a back focus at the wide angle end, and vd and $\theta gF$ respectively represent an Abbe constant and a partial dispersion ratio of a material of the positive lens included in the image stabilizing unit; and
a solid-state image pickup element for receiving light of an image formed by the zoom lens.

* * * * *